United States Patent
Hobbs et al.

(10) Patent No.: US 9,858,092 B2
(45) Date of Patent: Jan. 2, 2018

(54) CONTEXTUAL APPLICATION LAUNCH VIA SEARCH QUERY

(75) Inventors: Jeffrey Hobbs, Kanata (CA); Terry Tam, Ottawa (CA)

(73) Assignee: Mitel Networks Corporation, Ottawa Ontario (CA)

(*) Notice: Subject to any disclaimer, the term of this patent is extended or adjusted under 35 U.S.C. 154(b) by 939 days.

(21) Appl. No.: 12/930,481

(22) Filed: Jan. 6, 2011

(65) Prior Publication Data
US 2012/0179706 A1 Jul. 12, 2012

(51) Int. Cl.
G06F 17/30 (2006.01)
G06F 9/445 (2006.01)

(52) U.S. Cl.
CPC ............................. G06F 9/44505 (2013.01)

(58) Field of Classification Search
CPC ............... G06F 17/30592; G06F 9/445; G06F 9/44505
USPC .................................................. 707/602
See application file for complete search history.

(56) References Cited

U.S. PATENT DOCUMENTS

| | | | |
|---|---|---|---|
| 6,202,063 B1* | 3/2001 | Benedikt | G06F 17/30471 707/765 |
| 6,985,865 B1 | 1/2006 | Packingham et al. | |
| 2003/0158855 A1* | 8/2003 | Farnham et al. | 707/102 |
| 2003/0182394 A1* | 9/2003 | Ryngler et al. | 709/217 |
| 2004/0148334 A1* | 7/2004 | Arellano | H04L 29/06 709/201 |
| 2004/0225499 A1* | 11/2004 | Wang et al. | 704/257 |
| 2005/0050199 A1* | 3/2005 | Mital | G06Q 10/06 709/226 |
| 2005/0091192 A1* | 4/2005 | Probert et al. | 707/1 |
| 2006/0047653 A1* | 3/2006 | Vaidyanathan | G06F 8/20 |
| 2007/0276804 A1* | 11/2007 | Khan | G06F 17/30389 |
| 2009/0259636 A1 | 10/2009 | Labrou et al. | |
| 2010/0312782 A1* | 12/2010 | Li | G06F 17/30991 707/769 |
| 2012/0124062 A1* | 5/2012 | Macbeth | G06F 9/445 707/749 |
| 2012/0166276 A1* | 6/2012 | Chitnis | G06Q 30/0251 705/14.49 |

OTHER PUBLICATIONS

Launching Context-Aware Visualisations, Digital Ecosystems Lecture Notes of the Institute for Computer Sciences, Social Informatics and Telecommunications Engineering vol. 67, 2010, pp. 146-160.*

* cited by examiner

Primary Examiner — Tarek Chbouki

(57) ABSTRACT

Systems and methods for contextually launching a target application are disclosed. A method for contextually launching a target application includes communicating data from the target application to a search application. The data can be registered in a search registrar associated with the search application. Input can be received from a user using the search application. The input from the user can be compared with the data in the search registrar to obtain a result. The target application can be launched within the context of the input from the user based on the result.

17 Claims, 19 Drawing Sheets

CONTEXTUAL APPLICATION LAUNCH VIA SEARCH QUERY

BACKGROUND

Information Technology (IT) is advancing at a rapid pace. The speed of IT product development is seemingly increasing, with shorter times to market, rapid additions of new product features, and so forth.

To keep pace with and better manage IT resources, various aspects of information services and technology, including office technology applications and enterprise business software, are becoming consolidated, unified, collocated and/or integrated. While there are quantifiable benefits to these consolidated enterprise support systems, some simple day to day tasks in managing these consolidated services can be more difficult to initiate because of deeper, comprehensive, multi-tier navigation menus.

After initial deployment of a complex system including consolidated services and applications, an administrator's day to day duties may often be limited to performance of specific tasks. Some example tasks include, but are not limited to: user and user service management (add/edit/delete user, add email service, add telephone, manage access policies), system resource management (add storage, add telephony trunks, lines, and conferencing port etc.), system resource monitoring (telephony trunks available, application status, system events and alarms etc.), and so forth. While some of the tasks listed are directed toward telephony systems, it will be appreciated that any variety of a broad range of tasks may be performed by a system administrator which may be related to a particular industry or business for which the system administrator is administrating.

Thus, while the overall usefulness of a consolidated system may increase as a result of the consolidation, the day to day accessibility of some more commonly used features of the consolidated system can become more complex, cumbersome, and time-consuming to navigate and access. As a result, productivity is decreased and costs are increased.

With increasing consolidation and complexity, there is a desire for faster, easier, more direct and efficient means for navigating to and accessing components, applications, and so forth within the consolidated system.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
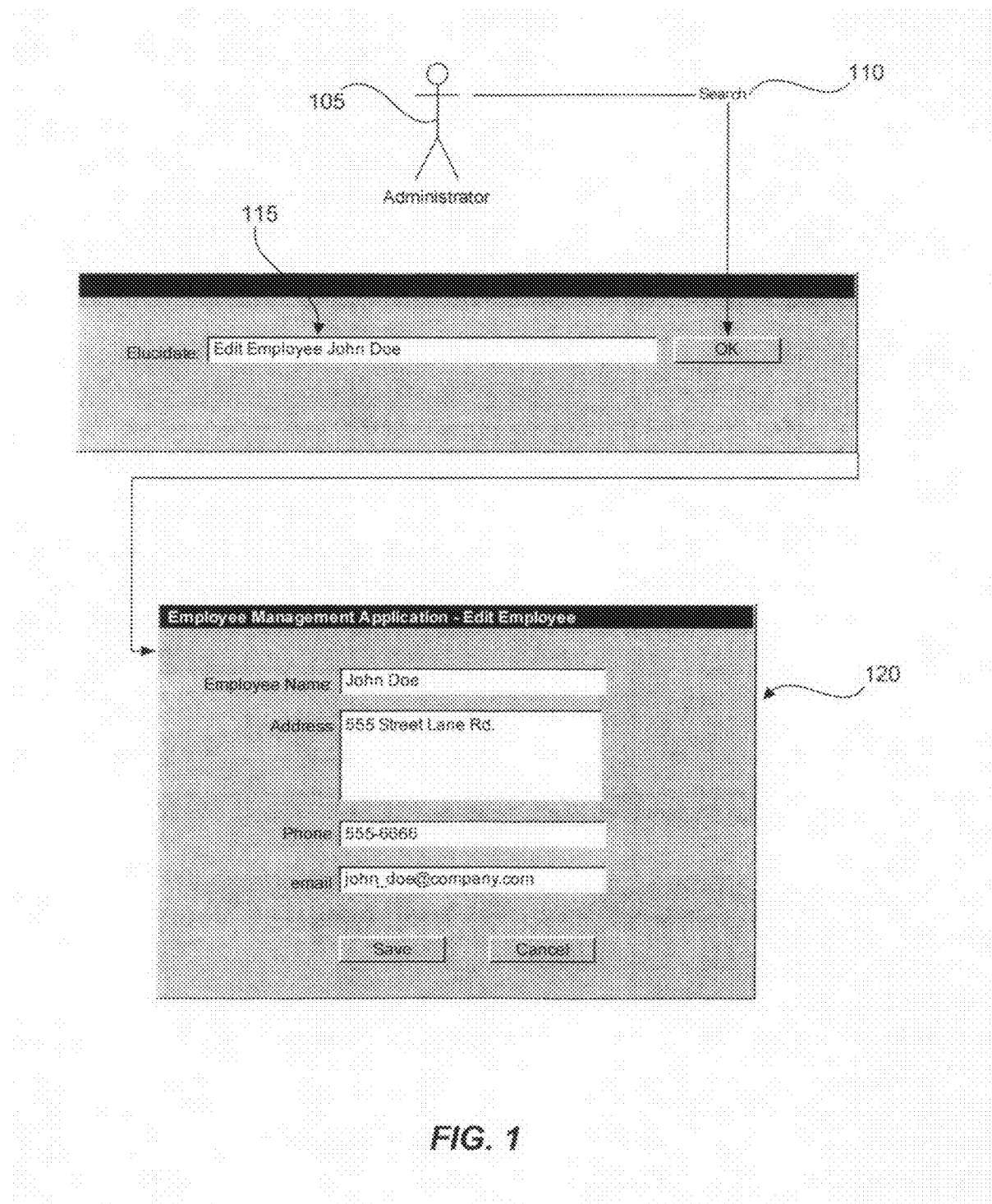
FIG. 1 illustrates a block diagram of an in-context application launch based on a search query in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, an "application" refers to coded instructions executable by a processor which can be used to perform singular or multiple related specific tasks. For example, an application may include enterprise software, accounting software, office suites, graphics software, and media players. "Application" does not refer to system software or middleware which manages and integrates a computer's capabilities or to operating systems. Also, an "application" is typically an independently operable application. For example, the following description describes an enterprise system for managing other applications. The other applications can be accessed and operated within or from the enterprise system. However, the other applications are typically applications which can also be operated independently of the enterprise system or are applications which were developed separately from the enterprise system and subsequently integrated into the enterprise system.

EXAMPLE EMBODIMENTS

As described above, an administrator's day to day duties may often be limited to performance of specific tasks. Understanding that the administrator tasks are generally specific tasks, the administrator generally may use two elements or components in performing the day to day duties. These components can include 1) The action(s) (or verb(s)) which the administrator would like to perform, and 2) the object(s) (or noun(s)) to which the actions are applied. For example, a task may be to edit employee "john doe", where <edit> is the action or verb and <John Doe> is the object or noun.

Using current interfaces for enterprise systems or applications operating as an umbrella system for various sub-applications, the administrator may a) navigate to and launch an "Edit Employee" or "Manage Employee" application; b) perform a search for the object in question (i.e., "John Doe"); and c) perform the action or task on the object.

Understanding that administrator duties are generally not limited to a couple of tasks each day, the repetitious navigation and searching can become tedious, time consuming, and cumbersome. In addition, not all tasks are performed frequently. As a result, some of the less frequently performed tasks, remembering and navigating to navigation paths to perform that task can be difficult. For example, a task may be to add or change a line or telephony trunk. However, for some businesses such a task may be less frequently used than employee management tasks, for example.

Accordingly, systems and methods are described for contextually launching a target application. In an example embodiment, a method includes communicating data from the target application to a search application. The target application(s) and search application can both reside on a same device, such as a workstation personal computer, a server, a smartphone, or any other suitable type of device. Alternately, the target application(s) and search application can reside on separate devices in electronic or optical communication with one another. The data can be registered in a search registrar associated with the search application. The search registrar can be formed integrally with the search application or may comprise a separate entity, such as a database which is accessible by the search application, for example. The search application and the search registrar can also reside on same or different devices. Input can be received from a user using the search application. The user can use an input device, such as a keyboard, mouse, touchscreen, etc. which may be peripheral or integral to a user device. The user device can be a computer, a smartphone, or any other suitable device. The user device can transmit the user input to the search application. The input from the user can be compared with the data in the search registrar to obtain a result using a comparison engine. The target application can then be launched within the context of the input from the user based on the result. The in-context launching of the target application will be described in greater detail below.

As described, the systems and methods can provide in-context searching and launching. With such a capability, the administrator can input a search string describing a task and the system can 1) find result(s) and 2) allow the administrator to launch a desired target application to enable the administrator to perform the task, abstractly within the application or directly within a record context.

FIG. 1 illustrates a search with context, containing objects (nouns) and verbs (actions). As illustrated, an administrator 105 can input a phrase 115, such as "Edit Employee John Doe" or simply "Edit John Doe". At least one of the objects or actions can be stored in the search registrar. For example, the registrar can store the verbs or actions in the registrar.

The objects or nouns can also be stored in the registrar. However, objects are more likely to change over time than the actions. As a result, ensuring that the registrar is up to date may provide additional work for the administrator which detracts from primary duties. Therefore, another option is to provide the search application with access to a data store of the target application. For example, an employee management application may include or have access to a data store listing employee records, including name, address, phone number, email address, position, hourly/salary wages, and/or any other desirable information. As another example, a firewall application can include a list of communication ports, status of the ports, whether data communications are allowed through the ports, and so forth.

As described above, data can be communicated from the target application to the search application. The applications under an umbrella application which includes the search application or search functionality can respectively communicate actions or verbs performable by the particular application to the search application to be stored in the search registrar. The data communicated can also or alternately comprise access to the respective data stores of the application. For example, the access data may include an address, such as a URL (Uniform Resource Locator), Internet Protocol (IP) address, a Media Access Control (MAC) address, and so forth. As another example, the access data can include a token, password, authentication, or other device for accessing secure data. As another example, the access data can include instructions or code for accessing the data. These examples are non-limiting and many other methods and systems for accessing the data store are possible. These other systems and methods are also contemplated and considered to be within the scope of this disclosure. In one aspect, the access data can provide direct access to the application data store. For example, the search application may be allowed to directly search, read, or otherwise access data in the data store. In another aspect, the access data can provide indirect access to the application data store. For example, the search application may access the data store by interfacing with the target application or another application.

The data communicated from the target applications to the search application can be unsolicited and proactively communicated. For example, many search engines crawl websites, hard drives, etc. and index the files that are found. In contrast, the target applications herein can proactively send data to the search application and the search application may have limited or restricted crawling abilities. Thus, the search application can search the data to which the target application has provided access and can use the verbs or actions relevant to the target application.

Referring still to FIG. 1, the input comprises a verb representing an operation for the target application (i.e., the "edit" or "employee management" application) and the input further comprises a noun representing a record managed by the target application. Upon selecting search 110, a search application can perform a query for the input. Using the input provided, the target application 120 can be launched in the context of the record. In this example, no navigation of a menu or other system features was used to find and launch the employee management application and no searching was subsequently performed within a launched application to find the desired object. Thus, from a single search application, an administrator can quickly and easily launch any of a variety of target applications within a desired record context and save time in navigating to and searching within a specific target application.

In a simpler example, the input can include a verb or action representing an operation for the target application without an object to be acted upon. In this example, launching the target application within the context may simply comprise launching the operation for the target application. In other words, if the input verb is "edit", the employee management application or edit employee application can be launched.

The search application has been described as registering the actions available for different target applications. In an example described above, the target applications send data to the search application to provide the search application with the available actions. In another example, however, the target application actions can be preprogrammed into the search registrar. For example, such a configuration may be used where the target application actions are locked and will not change and the available target applications are locked and will not change. However, many systems are dynamic and applications are added, removed, or updated with new or different functionality. As a result, the applications can include computer readable code to register the available actions when the application is installed, to unregister the available actions when the application is uninstalled, and to update the search registrar when the available actions are updated.

Figure 2:
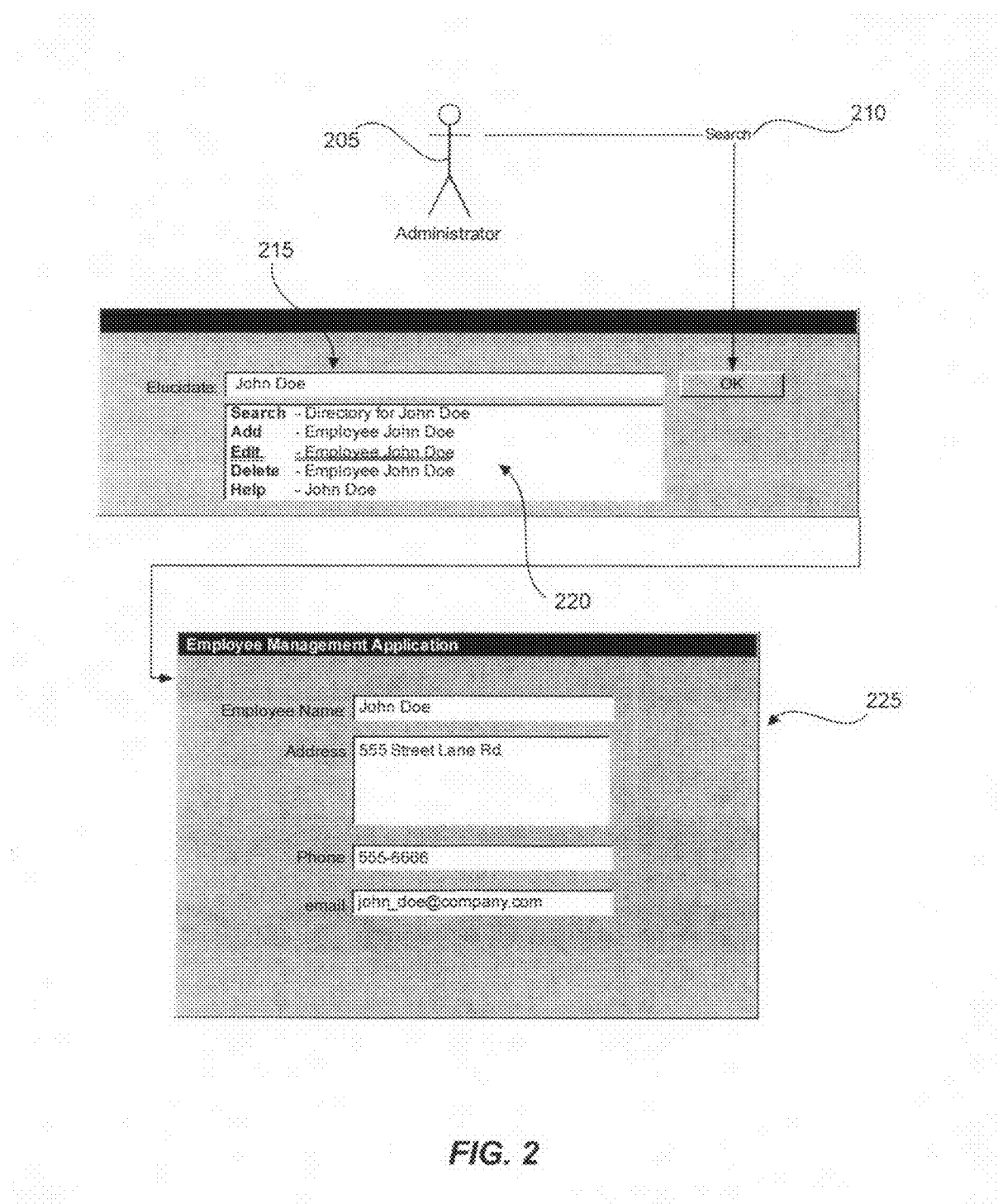
FIGS. 2-3 illustrate block diagrams of in-context application launching based on user selection of an application option presented in response to a search query in accordance with embodiments of the present invention.

Referring to FIG. 2, the administrator 205 may desire to input one or more nouns 215 into the search application to be presented with a list of tasks 220 or verbs to apply to the noun. For example, the administrator can enter "John Doe", and as a result of a search 210 the system can suggest a list of tasks available for this noun such as "Edit Employee record", "Edit phone Settings", "Add a Voice Mailbox". Upon selection of the desired task, the appropriate application 225 is launched within the context of the object or noun.

The list of actions available for object "John Doe" can be based on a search of the application data stores. For example, the search application can use the input search string "John Doe" to look through application data stores to determine whether the application has a record of "John Doe". If a record is found, the search application can determine whether specific available actions are provided within the data store. For example, a particular application may be able to perform multiple different actions on the object or may be limited to performing one action on an object. In one aspect, the search application may not list any actions from a particular target application even if the object is found when an action is not associated with the object within the data store.

Searching application data stores for the object can reduce or eliminate listing of actions which are not performable on the object. For example, a firewall application may not include a "John Doe" record and may also be unable to perform an action related to "John Doe". A search of the firewall application data store would return no results and the search application can appropriately list no actions associated with the firewall application for employee "John Doe". Thus, the list of actions for the input object can be limited to those actions performable on the object or applications related to the object as determined by the search results.

The actions listed for the input object may comprise names of the applications, such as "employee management" or actions performable by the applications. Also, a help application can be provided in the list, if desired, for an input search string, whether the input comprises an object or action or both and whether the search application finds any results or not.

Figure 3:
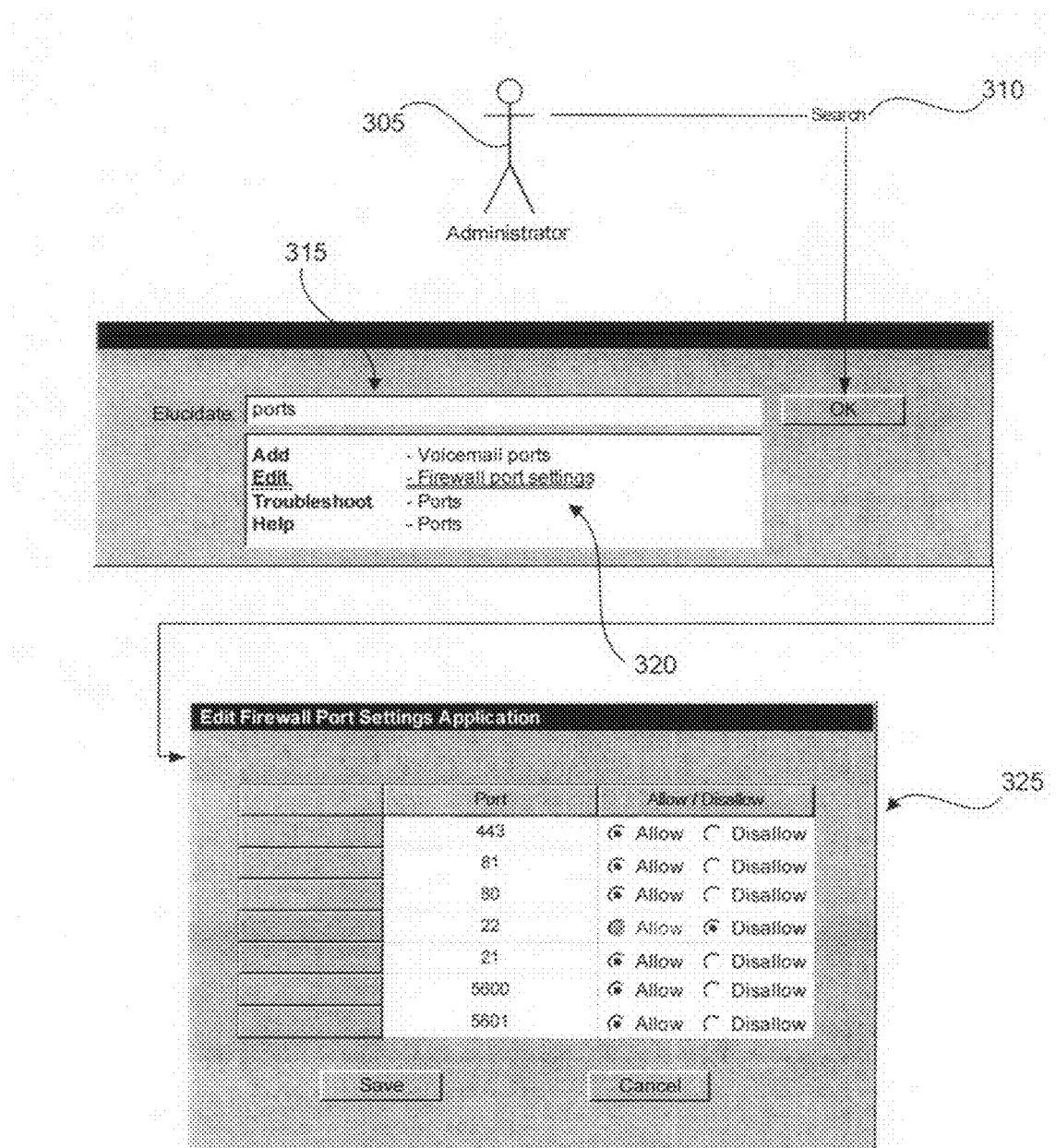

In some cases, the administrator may be unsure of the objects or nouns to act upon but may understand the task at hand. For example, some tasks may involve querying data within an application using the application interface. Some example inputs which describe or imply a task may be, "Help", "employees", "settings", and so forth. In such an example, the system can provide suggestions for appropriate applications launch. FIG. 3 illustrates an example where "ports" is provided as the input 315 from the administrator 305 and the search 310 lists actions 320 for a voicemail application, a firewall application, a troubleshooting application, and a help application. In this case, the word "ports" could be construed as a verb or a noun and the search application can provide relevant search results based on the search registrar and based on a search of the application data stores. The administrator can select and launch a desired application 325 from the list.

In some instances, the administrator may input an action or object which is misspelled or doesn't completely align with what is found in the search registrar or the data store. For example, the administrator may input "Johm Doe". The actual employee record may be listed as "John H. Doe". The search application can find an employee record most similar to "Johm Doe" and suggest "John H. Doe" to the administrator. As another example, the administrator may input an action such as "manage" or "change" or "editing" when wanting to access the edit employee application. However, the edit employee application may have provided "edit" as a verb for accessing the application. In this example, the input is not registered in the registrar. The search application can reference an electronic dictionary or electronic thesaurus to identify identifying a similar action and compare the similar action to the data in the search registrar. Similarly, if an input includes an unrecognized noun or object, the search registrar can search a dictionary or thesaurus to identify a comparable object to search for within the target application(s). For example, the administrator may input "cell phone" and the search application can return a result including "telephone" or "mobile phone" with access to an employee management application or other suitable application.

As another example, the target applications or the search application can include or provide the dictionary, thesaurus, or other list of terms to use when an input is not recognized. For example, the search registry may include an association of the word "spreadsheet" with "Microsoft Excel" ®. As another example, the application data store can include a list of aliases or synonyms for objects.

It is noted that the use of dictionaries, thesauruses, and other registration of similar or related actions, objects, and so forth are portable to other languages where actions, objects, etc. can be appropriately mapped.

Figure 4:
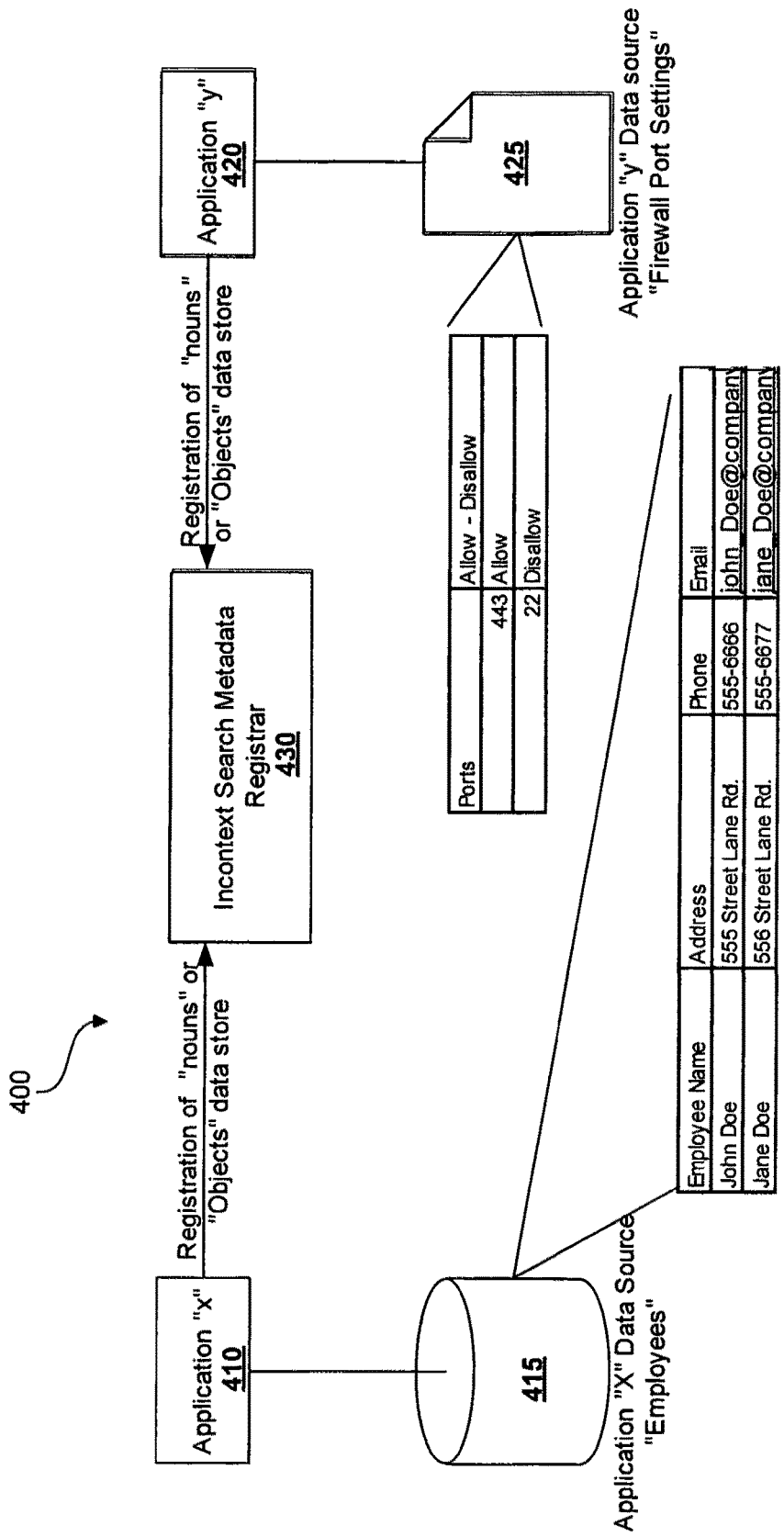
FIG. 4 illustrates a system for in-context searching and application launching, including registration of objects in a registrar, in accordance with an embodiment of the present invention.

Reference will now be made to FIG. 4. To collect the nouns or objects, a system 400 can provide for a registration (push or pull) of application data sources 415, 425 or data stores. This enables the target applications 410, 420 within an umbrella solution to supply a location of the nouns or objects. In one aspect, this can include providing a database table or data access object, or a REST (Representational State Transfer) interface. This access to this registered data source may comprise a read-only interface. The registered target application can limit the scope of data or leave the data set open ended for the system to collect all possible nouns and other data.

For example, the nouns collected from Application "x" can be generated from an aggregate of categories (fields in a data base table), such as Employee name, Address, email, and so forth, including the actual database row values. For example, Application "x" includes categories for name, address, phone and email with records for John Doe and Jane Doe.

As with the nouns, a registration process can be provided to identify how to invoke the actions (e.g., Settings, Help, Configure, and Edit). For web based applications, a URL query string may be sufficient to allow for launch of an application. Additionally, arguments in the query-string can be sent or included in the URL string. The application registration process for the search registrar 430 may provide a base URL such as the following:

http(s)://[relative/absolute.address]/ applicationspace.ext?action='verb'&c ontext='noun'

As applied in an example for "Edit employee John Doe" in a Java™ Servlet (JSP) type web application, the URL may be as follows:

https://host.company.com/ employee_management.jsp?action='edit'&cont ext='John Doe'.

In some cases the application may not map the verb exactly to the technical/programmatic action in the web application URL query string argument. The registrar can allow for a mapping of actual to human readable strings. For example the action string could be required as follows:

https://host.company.com/ employee_management.jsp?action='MOD'&co ntext='John Doe'.

Because of specific application design the technical action is listed as MOD (i.e., an abbreviation for "modify") but the real verb or task to be performed is "Edit". The registrar can allow for this interpretation to be provided by the registering application or can use the dictionary or thesaurus functionality as described previously.

The action or verb can be built directly into the application framework space. In the example below, there is no verb or action argument. However, the application space "edit_employee.jsp" implies the verb or action:

https://host.company.com/ edit_employee.jsp?context='John Doe'.

Therefore, in the example above, the application can register a verb mapping of:

Verb{edit_employee.jsp="edit"}

Figure 5:
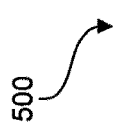
FIG. 5 illustrates a table for mapping a search query to an action, object, or application in accordance with an embodiment of the present invention.

Normalization and thesaurus of registered or discovered actions or nouns has been described above. The system can recognize the registered actions/verbs and map these to other explicitly similar and common known actions. For example an "Edit" verb registration can be mapped to "modify", "change" or "configure". However, beyond the explicit thesaurus, target applications can further expand the verb thesaurus context when registering actions/verb during the regular registration. FIG. 5 depicts a table 500 of the registration results and mappings overviewed in FIG. 4 with additional information for normalization, thesaurus mapping, auto-completion, contextual launching, application addresses, and so forth. It is noted that in FIG. 5 the <<1>> is a tag place holder for the managed object data or translated managed object data.

Figure 6:
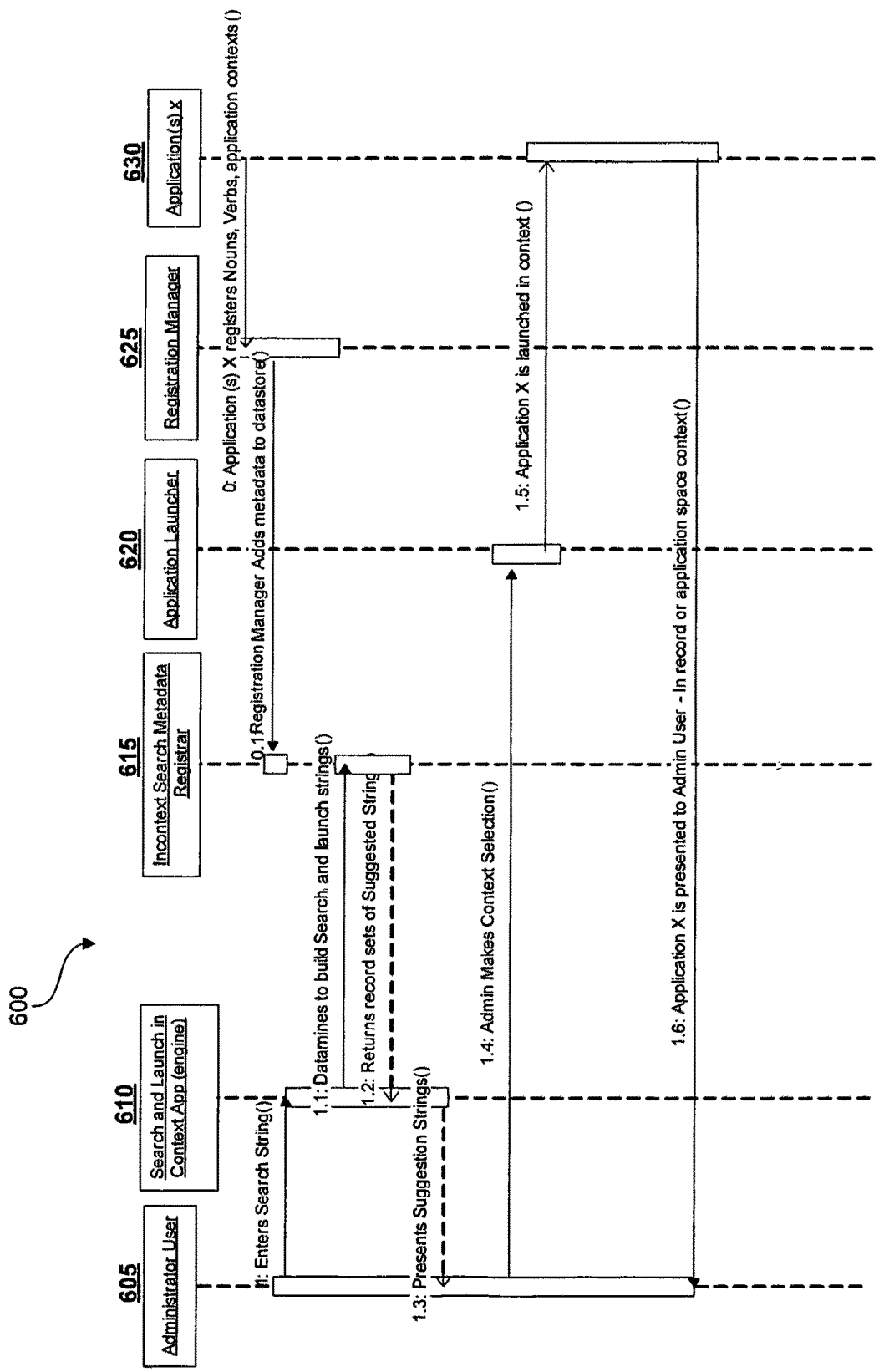
FIG. 6 depicts a message sequence chart for registering an application, performing a search, and launching an application in context in accordance with an embodiment of the present invention.

Referring to FIG. 6, a system level sequence overview diagram for a system 600 is shown to illustrate some of the system components and sequences for performing in-context searching and launching. As a broad overview, the sequence includes an application registration process (0) followed by search and launch operations (1) to launch an application in context.

The system includes a registration manager 625 for managing registration of nouns, verbs, contexts, and so forth with the search registrar 615. The sequence diagram begins at steps 0 and 0.1 where the registration manager adds metadata to the search registrar based on registration information from the target application(s) 630. Applications may register data stores of nouns and verbs, as well as verb mappings, at any time. Applications, nouns and verbs may come and go. Thus, the registrar can be a random access transient metadata store.

At step 1, a search string is entered. This can be a human, system administration invoked action. The administrator 605 can provide a search string for the system to interpret, as illustrated in FIGS. 1-3.

At step 1.1, the search application 610 can data-mine the search registrar 615 to build search and launch strings. The search application can perform data-mining or querying of the registered metadata data-store based on the administrator input from step 1.

At step 1.2, the search registrar 615 can return record sets of suggested strings and in context tokens to the search application 610.

At step 1.3, the human administrator 605 can be presented with the suggested string data set, expanded from the original search string entered in step 1.

At step 1.4, the human administrator 605 can make the desired selection and the request can be sent to the application launcher 620.

At step 1.5, the application launcher 620 can formulate application launch arguments to build the launch context for the selected application 630 and can proceed with the actual launch of the target application.

At step 1.6, the application 630 can be presented to the human administrator 605 having the action and or object loaded in context.

The described in-context search and launch systems and methods can save time, effort, and money for a business and a system administrator, and can simplify many actions and processes which may otherwise be more tedious and cumbersome. Following are some example systems and methods which can be based on and include the above-described in-context search and launch to provide additional functionality or usefulness, or which can operate independently of the above-described in-context search and launch. While at least some of the following embodiments may be operable independently of the in-context search and launch, similar terminology, system components, and examples will be used to describe the following embodiments for simplicity.

Range programming for a web application (or any other type of application) traditionally involves custom code written by the application developer. The range programming code is typically embedded within the application for which the range programming code was written. In one example, adding range programming code to an application may include adding a custom range programming UI (user interface) for a particular form used by the application. Writing the range programming code can be an involved and application specific task. The range programming code is usually is not reusable or not fully reusable among the various applications with which the application developer may be involved.

Systems and methods are provided herein for providing range programming functionality which does not involve direct modifications to a particular application. The systems and methods can be used to provide range programming capabilities for applications which do not support range programming. This can enable a product implementer who uses third party software components to provide range functionality to third party applications where there is no direct access to modify the third party application code. The systems and methods can also provide easy, rapid, and generic range programming for existing applications for which the source code is under a developer's control.

In one aspect, the range programming can be accomplished by building on the in-context search and launch described above. However, the range programming systems and methods can also be used independently of the in-context search and launch systems and methods.

An example embodiment of a method for implementing the range programming is as follows. A range programming command input by a user can be formatted in a form of a search query. A search client can send the search query to a search server. The search server can determine a list of elements in the range stated in the search query and respond to the search client with a new search query. The search client can display the new search query to the user. The new search query can include the initial range element (N) and the next range element (N+1) to launch in context. If the user approves of the operation, the user can select an appropriate indication on a user interface and the search client can send the query back to the search server. The search server can launch the appropriate application with the context of element N, and respond back to the search client with a new search query containing information on range element (N+1) and (N+2). This handshaking can continue between the user and the search server until all of the range elements has been satisfied or addressed.

In another example, the user can enter a token that indicates that the user desires to see all of the results within the range at once. This can be easily managed from a UI perspective on a desktop or other computing system by opening a unique window (or a unique tab or frame within a window) for each range element. Computing systems today generally have built in functionality for managing multiple open windows, such as a taskbar, or browser, for example. If a target application is able to handle range programming in context directly, the search server can pass the range directly to the target application.

Figure 7:
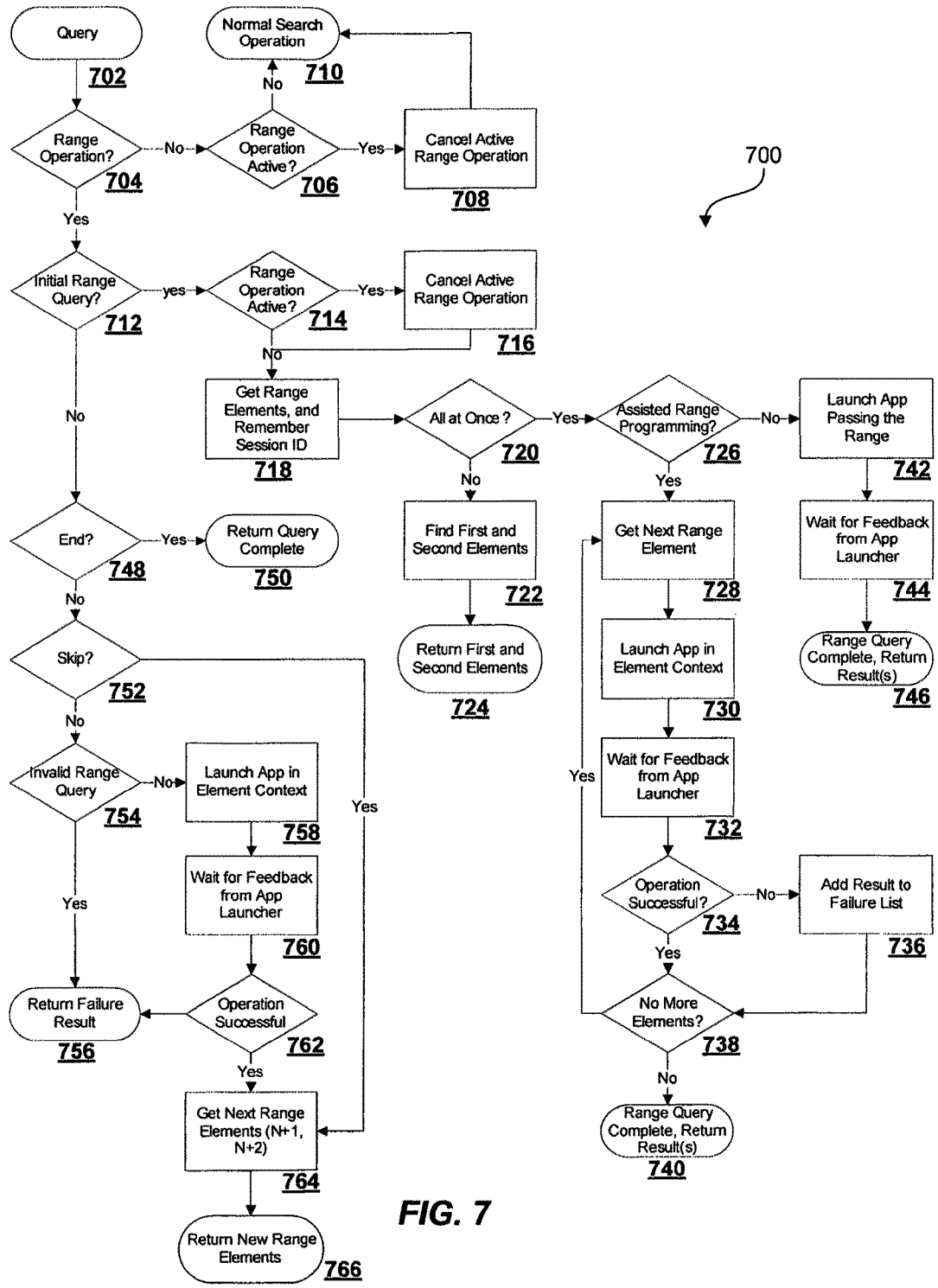
FIG. 7 illustrates a flow diagram of a method for range programming via search query in accordance with an embodiment of the present invention.

FIG. 7 illustrates a range programming method 700 similar to that described above. A user can input a search query 702. A search application can determine 704 whether the query is requesting a range operation. The search application can include a range operations module for processing the range operation when the query includes a range operation. If the query does not include a range operation, the method queries 706 whether a range operation is active. If a range operation is active, the range operation can be canceled 708 and the method can proceed by performing 710 a normal, or non-range, search operation. If a range operation is not active, the method can proceed by performing 710 a normal, or non-range, search operation. If a range operation is active, the method can include prompting a user whether to cancel the active operation.

In this example, the system is programmed to enable a single instance of a range operation at one time. However, the system can alternately be programmed to enable multiple simultaneous range operation instances. In such an example, the method can omit querying whether a range operation is currently active. In an example where multiple instances are permitted but limited, the method can include querying how many instances are active and cancelling an active operation when a maximum number of range operations are currently active.

If the query comprises a range operation ("yes" at 704), the method 700 can query 712 whether the range query is an initial range query. In other words, the method can determine whether the query is a continuance of a previously activated range operation or whether the query is an initial or new range operation. If the query is an initial range query, the method can determine 714 whether a range operation is active and cancel 716 the range operation as described above.

The range query can then begin by identifying 718 range elements from the query. The method can also store 718 a session identification associated with the query. The session identification can be used later to determine whether a query is an initial range query or a continuation of a previously started range query, as will be understood from the following discussion.

The method 700 can identify 720 whether the user query requests to have all the results returned at substantially the same time. If no, the elements within the range can be identified 722 and returned 724 to the user one at a time. For example, the first element, such as an employee record, can be returned to the user and the search application can prepare a new query for displaying the second element. Also, an identification of the second element, such as an employee name, can be displayed with the first element to indicate to the user the next result (i.e., the second element). The user can select to close the first element and/or to proceed to the second element from within the display of the first element or from the search application.

Continuing in the method 700 from determining 712 whether the query is an initial range query, the system can receive the new query for displaying the second element and determine that the new query is not an initial range query. Before displaying the second element, the method can include providing 748 an option to the user to end the range query. The method can then notify 750 the user that the query is complete. Also, if there are no more elements within the range, the method can notify the user that the query is complete. Also, before displaying the second element, the method can include asking 752 the user whether to skip the second element to proceed to the third element. If yes, the method proceeds 764 to the next range element(s) and returns 766 the element(s) to the user. If no, the method can determine 754 whether the range query is valid. If yes, the method can return 756 a failure result to the user. If no, the method can launch 758 a target application in the context of the current range element. The method can wait 760 for feedback from the application launcher to determine 762 whether the application has correctly launched, whether the application has launched in context, and/or to determine when a user has finished with the element context in that application. If the overall operation was successful, the method can proceed 764 to get the next range element(s) to return 766 to the user. The method can proceed from the query, similarly as from when the first and second elements were returned to the user by continuing the query at 712 or even 702. The session identification can be used to track a session to continue an incomplete session. If not successful from 762, a failure result can be returned 756 to the user.

Continuing in the method 700 from determining 720 whether the user query has requested all range elements at once, the method can determine 726 whether to perform assisted range programming. In other words, the method can identify whether the target application natively supports range programming. If the target application natively supports range programming, then the system can launch the application and pass 742 the range to the application without providing assistance to the target application. The search application can wait 742 for feedback from an application launcher 744 and then return 746 the results to the administrator. If the target application does not natively support range programming, the search application can retrieve 728-738 the range elements one at a time (or substantially simultaneously if multiple target application instances are permitted) by launching the application in element context until all the range elements have been retrieved and then returning 740 the results all at once to the user. If the operation fails to return any of the elements, the result can be added 736 to a failure list which can be returned to the user to notify the user of results that were not returned.

The range programming methodology can support various range operations. A non-exhaustive list of some basic range operations include: range add, range delete, range edit, and range display (read).

Figure 8:
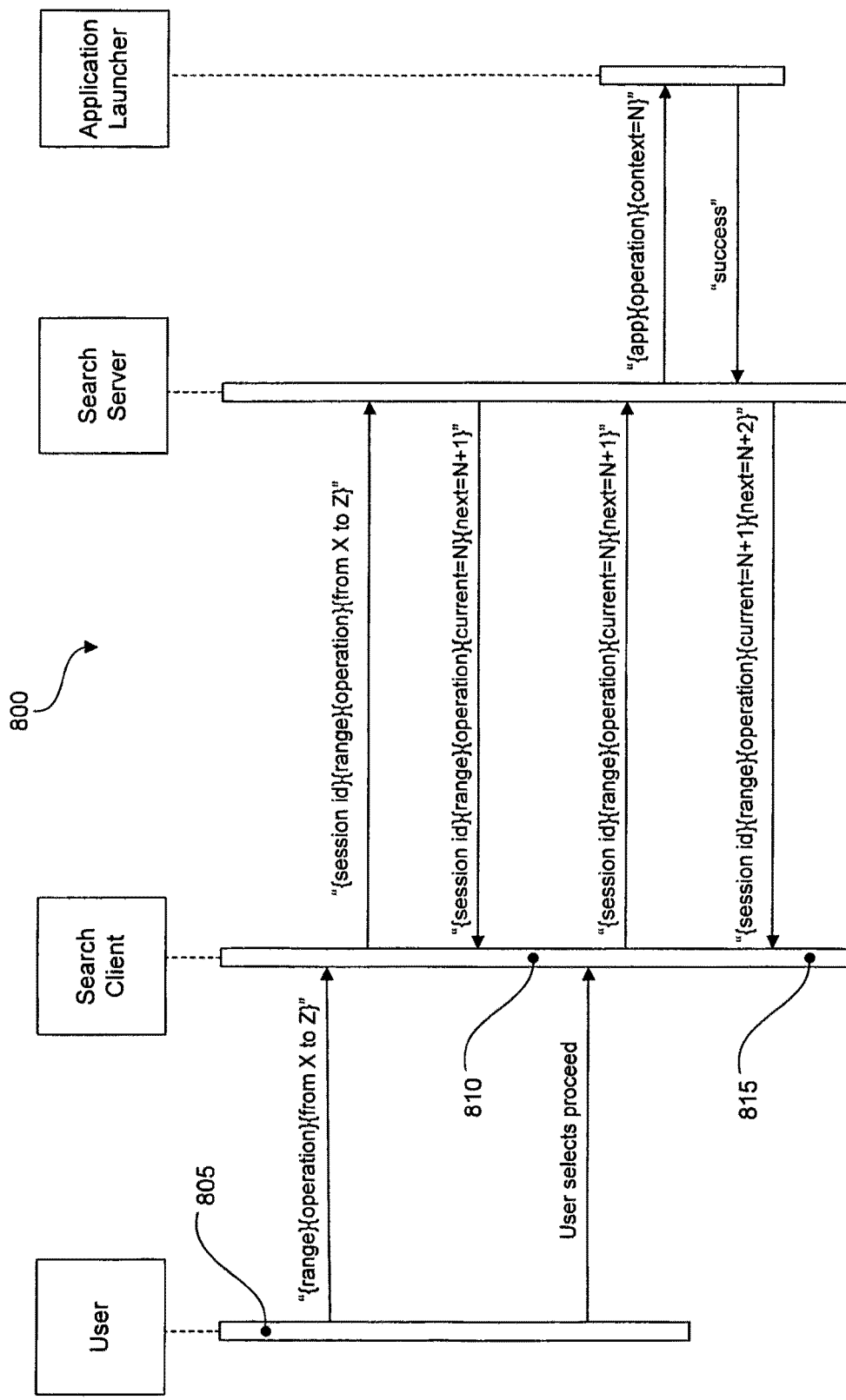
FIG. 8 depicts a message sequence chart for presenting range operation results one at a time in accordance with an embodiment of the present invention.

FIG. 8 includes a Message Sequence Chart (MSC) 800 illustrating performance of a range operation where results are presented individually to a user, one at a time. As shown in FIG. 8, the user enters a search query 805 into the UI formatted as a range query. The query has enough detail to signify that the query is a range operation, what the operation to perform is, and the range requested. The client side code of the search application or client can pass the query to the server side of the search application. The server side can process the query and return a new query indicating the current context and the next context of the range. The user can signify 810 that the query should proceed and the server side application will proceed to launch the respective application in the context of the range element and operation requested. Each application launch can result in a new window appearing 815 on the desktop. The dots 805, 810, 815 included in FIG. 8, and also included in FIGS. 9-15 without callout references, represent user input or prompts for user input.

Figure 9:
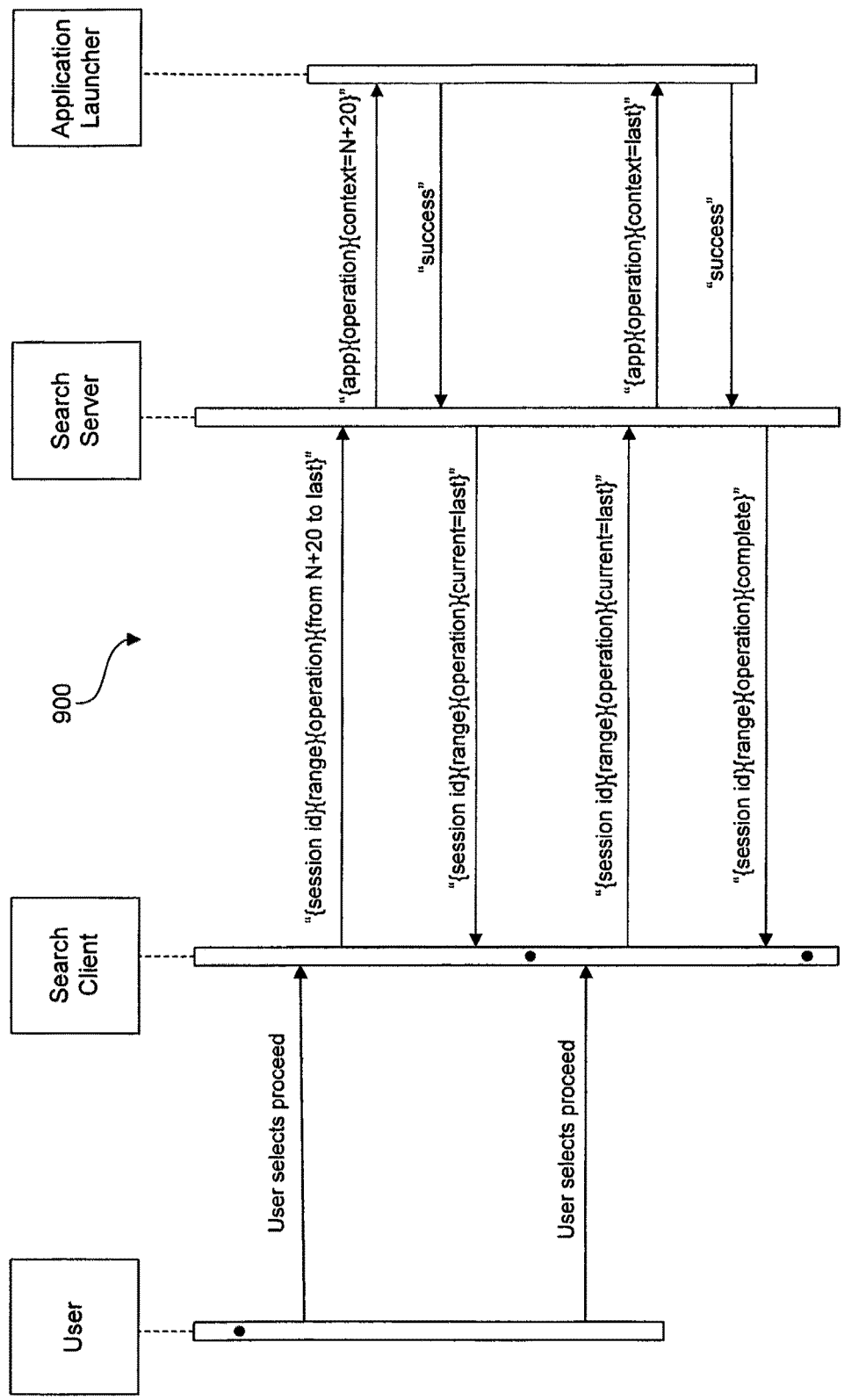
FIG. 9 depicts a message sequence chart for presenting range operation results one at a time until the last range result is presented in accordance with an embodiment of the present invention.

The operations can continue until the last range element is reached as shown in the MSC 900 of FIG. 9. Once the last element has been processed, an indicator is provided to the user that all operations have been complete. Blanking out the search query box of the search UI can be an easy success or completion indicator.

Figure 10:
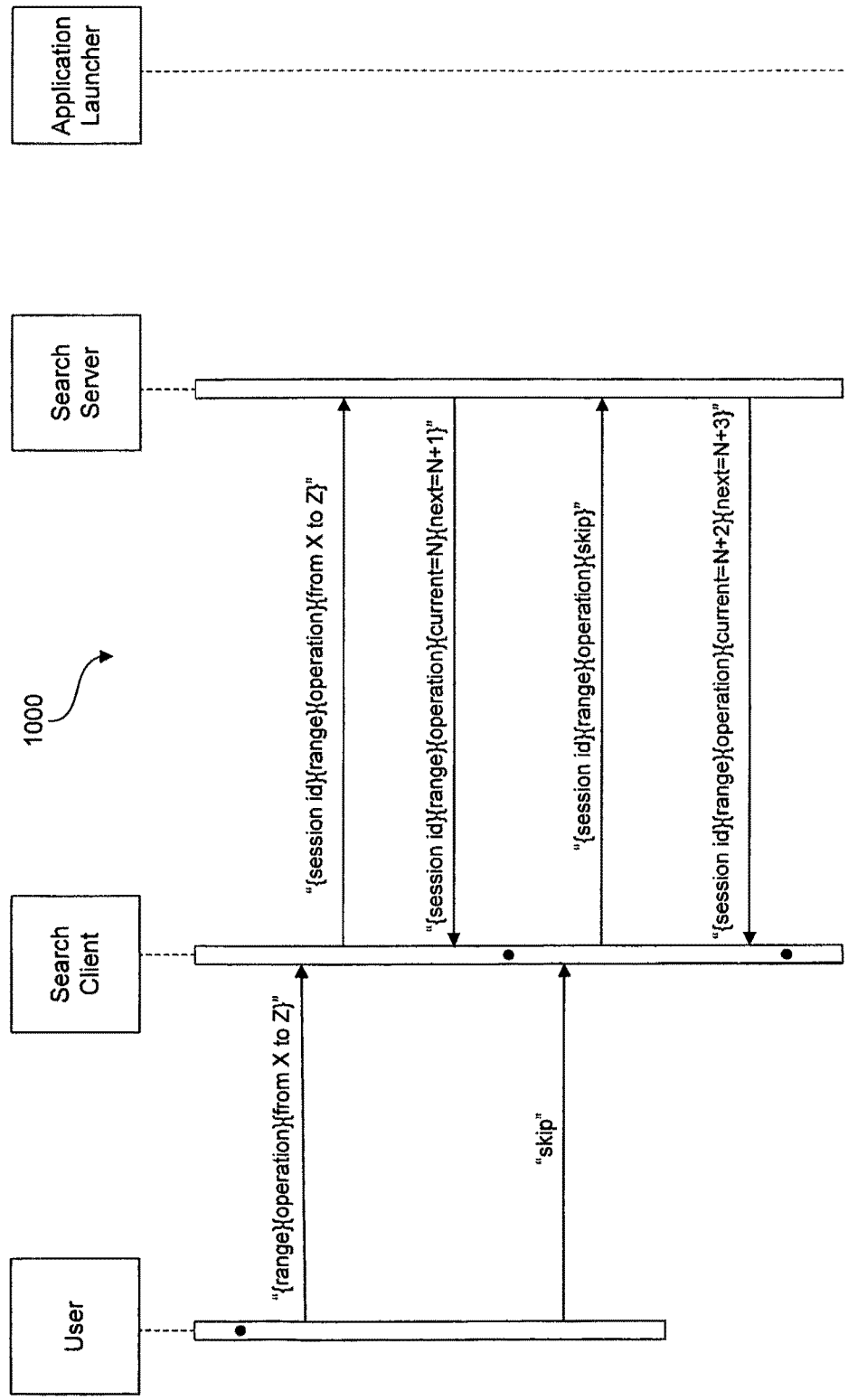
FIG. 10 depicts a message sequence chart for skipping a portion of a range result from a range operation in accordance with an embodiment of the present invention.

Referring to the MSC 1000 in FIG. 10, where range operation results are presented serially, the user may wish to skip or filter part of the range results. The user can do this by changing the new search query sent by the search server to a special token signifying to skip the new search query and go to the next query result.

The method shown in FIG. 7 can be extended with various tokens or management operations, including the skip token, such as the non-exhaustive operations list shown in Table 1 below.

TABLE 1

| Token | Result |
| --- | --- |
| skip N | Skip to the current range element + N, where N is an integer |
| skip | Equivalent to "skip 1" |
| prev N | Move back to the current range element − N, where N is an integer |
| prev | Equivalent to "prev 1" |
| filter {criteria} | Filter the list of range elements based on the filter criteria. For example, "filter show teleworker users" will only provide range elements that has a relation to the teleworker service. |
| jump to {criteria} | Move the index of the range element list to the position stated by the criteria. For example, "jump to first name j" will move the current range element index to the first element containing the first name beginning with the letter j. |
| sort {criteria} | Specifies the sort criteria of the range of elements. Changing the sort order will move the index position of the list of range elements to the beginning. |
| sort default | Performs the sort operation using the default system criteria |

Figure 11:
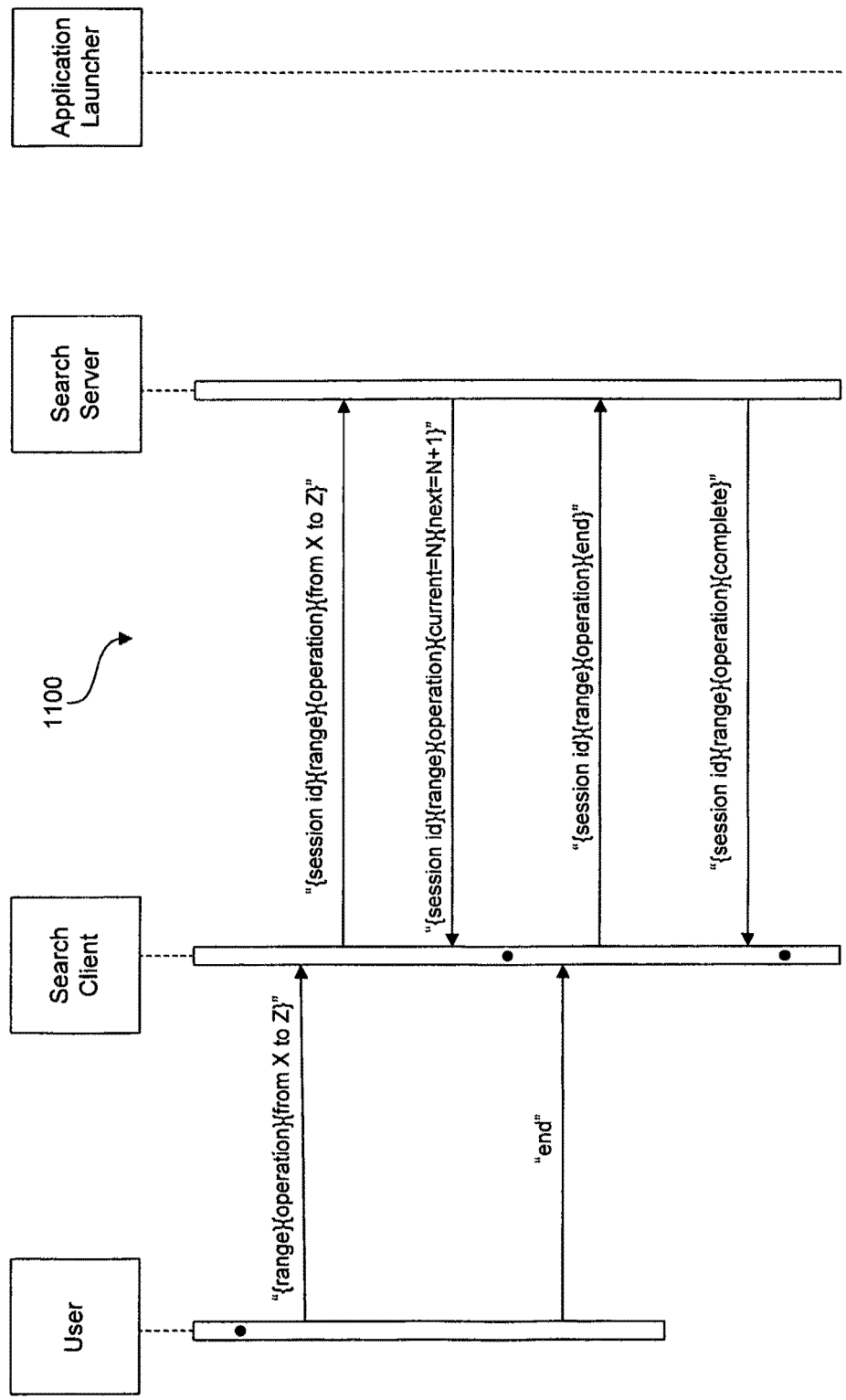
FIG. 11 depicts a message sequence chart for aborting a range operation in accordance with an embodiment of the present invention.

A user can abort the range operation by changing the new search query presented by the search server with a special token indicating to abort the operation. FIG. 11 depicts an MSC 1100 illustrating a case where the user changes the new query to a string token "end" to indicate to abort the operation.

Figure 12:
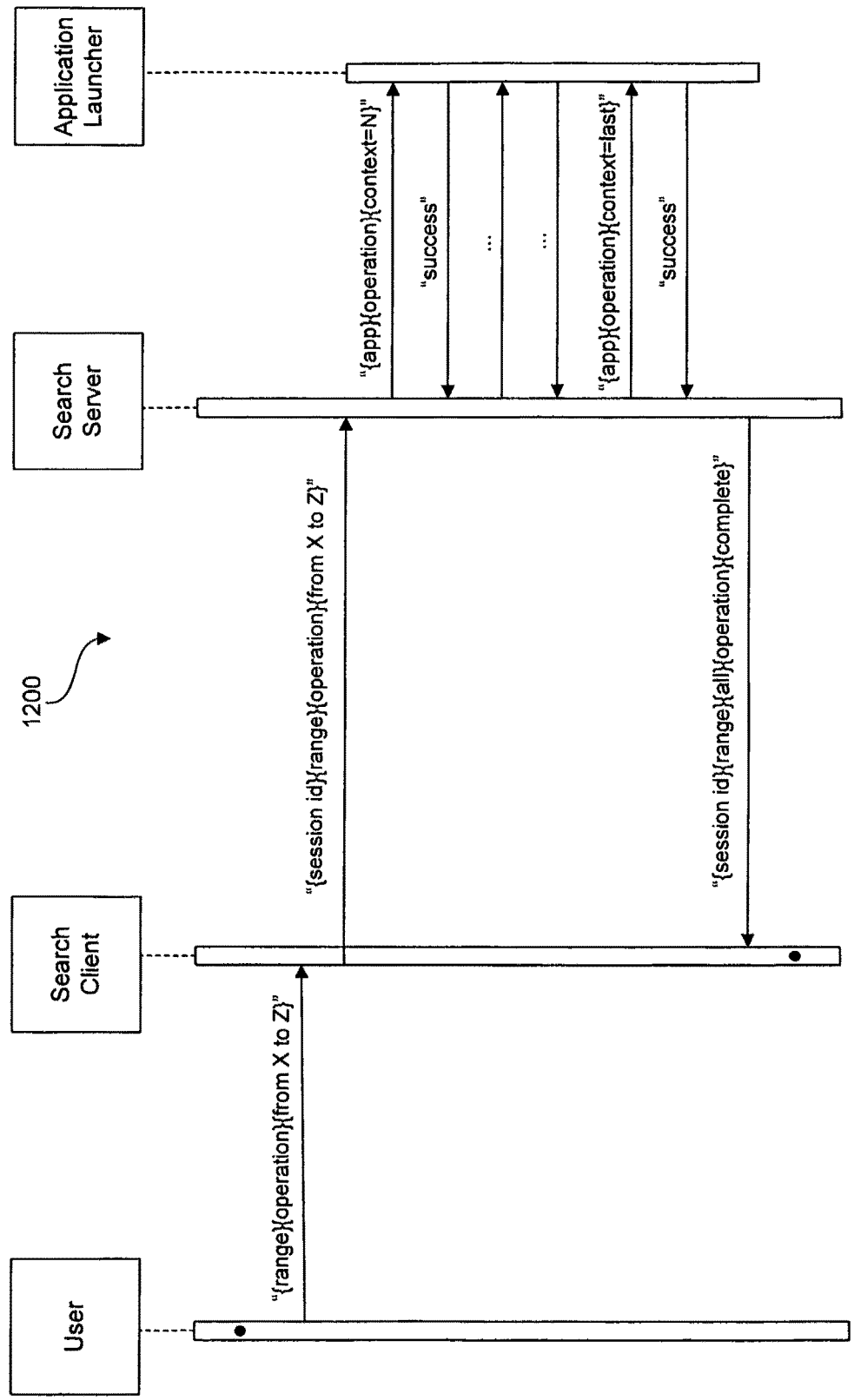
FIG. 12 depicts a message sequence chart for presenting range operation results simultaneously in accordance with an embodiment of the present invention.

The windowing management system of the computing systems can allow users to open multiple windows at once with ease. Leveraging this all instances of the range operation results can be launched at once. FIG. 12 illustrates the all-at-once launching using a Message Sequence Chart (MSC) 1200. An example use of the all-at-once feature is as follows. An Administrator wishes to edit all the users in "Sales Team X". The Administrator can input the following search query: "range edit, sales team x, show all". The search client can pass the query to the search server. The server side proceeds to launch edit user windows in the context of the entire Sales Team X. If there are four members of the team, the system will launch four edit user windows, one for each member of the team, each in a context of the respective team member. After the administrator finishes editing a particular user, the administrator can close the window and edit the next user or proceed with a different action if all of the users have been edited.

Figure 13:
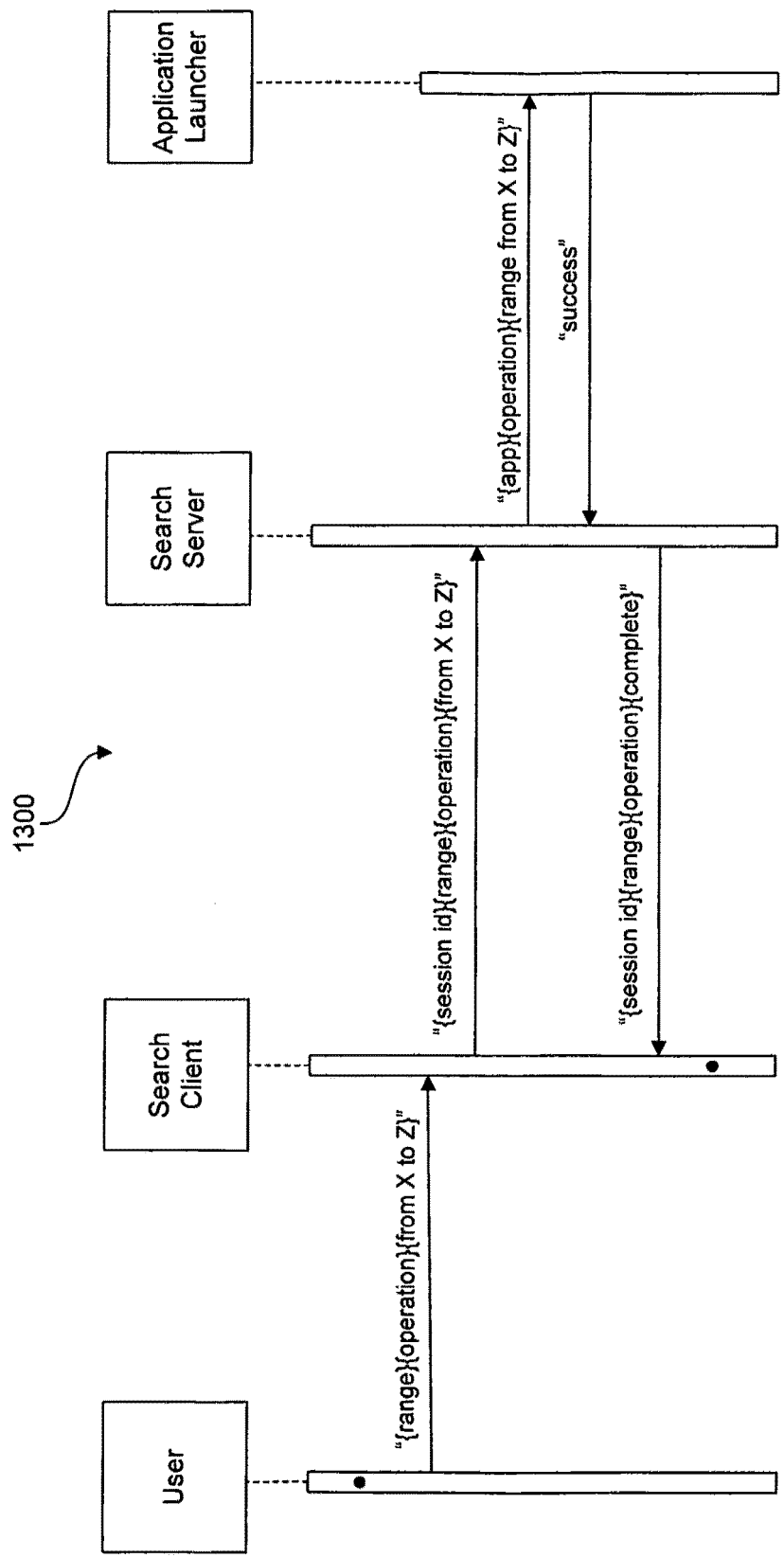
FIG. 13 depicts a message sequence chart for launching a range programming enabled application in accordance with an embodiment of the present invention.

FIG. 13 illustrates a MSC 1300 showing an example where the application to launch supports range programming. In this example, the search server acts as a query interpreter pass through. In other words, the search application, such as the server side search server, can pass the range query to the application or to an application launcher. The application can then return the range of results requested. In some cases, a range query acceptable by the search application may not be acceptable by the target application. In such a case, the search application can act as a query interpreter and interpret the query into a structure recognizable or acceptable to the target application.

While the range programming described above has been discussed primarily with regards to web based desktops, the range programming systems and methods can also be used with local desktop applications or mixed local- and web-based environments.

An extension of the search and launch and/or range programming is the creation of shortcuts based on the search query. While creation of shortcuts for applications is widely used, particularly in the context of desktop applications, the shortcut extension herein enables the creation of a shortcut in context with managed object data (or a managed object data record). In other words, a shortcut can be used to launch an application within a specific context, such as to perform a specific action or to manage a specific data record for example. A shortcut can be a copy of a search query string that was last executed by the server side search application.

A user can signal via a (series of) token(s) or keyword(s). An example input of a series of tokens or keywords is to input "create shortcut" in the search query. After the search application has performed the requested query/command the user can enter the keywords "create shortcut" to instruct the system to create a shortcut to execute the last query/command. This is illustrated in the MSC 1400 shown in FIG. 14.

Figure 14:
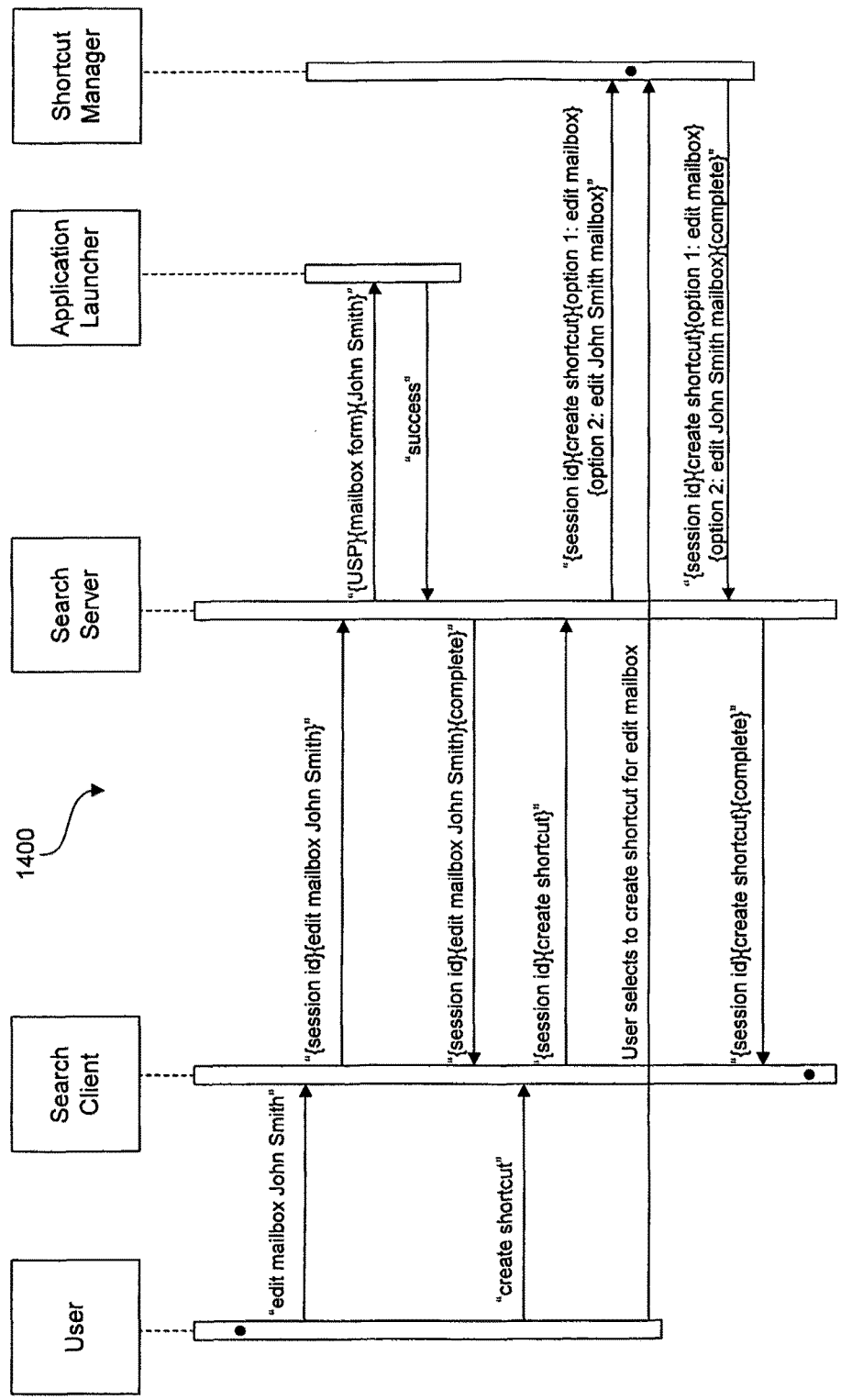
FIG. 14 depicts a message sequence chart for creating a shortcut based on a search query in accordance with an embodiment of the present invention.

The example in FIG. 14 depicts a scenario where the user wishes to edit John Smith's mailbox, and then wishes to create a shortcut of the action. The sequence order may proceed as follows:

a. The user enters "edit mailbox John Smith" in the search query box UI.
  b. The system launches the application in the context of the mailbox for John Smith.

c. The user then wishes to create a shortcut for the operation of editing the mailbox.
d. The user enters "create shortcut" in the search query box UI.
e. The search server knows that "edit mailbox" can be performed specifically for the user John Smith, or as a search query fragment waiting for context. If the user chooses the John Smith option, the shortcut will launch the application in the mailbox context and further in the context of John Smith. If the user chooses the fragment option, the shortcut will focus the search query box UI and pre-fill the box with the string "edit mailbox". The search server can signal to the shortcut manager that a new shortcut is requested.
f. The shortcut manager can prompt the user via a popup window and present the two shortcut options.
g. The user can select to create a generic edit mailbox shortcut (or a specific edit mailbox shortcut, as the case may be).
h. The shortcut can be created for the generic edit mailbox scenario.

The shortcut can appear as an icon, link, or other shortcut representation for the user to select. In this manner, the user can quickly perform in-context searching and launching or range querying using shortcuts and without manually inputting a search query to perform the desired operation.

Other example implementations for creating shortcuts include inputting a token, such as "new shortcut" immediately followed by a query to define as the new shortcut, or inputting a token to indicate that a query entered after the token is to be defined as a new shortcut.

The systems and methods can track statistics on the search query behavior of one or more users. When multiple users are tracked, the system can create multiple profiles for each separate user. For example, the system may track how many times a particular application was launched (including by a particular user) and in which context. This data can be used to feed a threshold mechanism to trigger shortcut create suggestions. For example, a user may frequently edit a mailbox using a User and Services Provisioning (USP) application. A predetermined threshold can be set such that if a sequence has been used more than 15 times, for example, a shortcut suggestion will be presented to the user. In this example, if the user edits a mailbox via the USP application and the query is the fifteenth query, an auto shortcut can be suggested. After the mailbox context is launched, a popup window can be presented with the contents similar to: "We have noticed that you edit mailboxes frequently. Would you like a shortcut created for this operation?"

Multiple queries and operations can be grouped to form more advanced and intricate operations. The systems and methods can provide these more advanced and intricate operations via a macro record and playback module. The managed object data in the queries and operations during the queries can be recorded and replaced with generic indexed placeholders that allow the macro to be reused in a generic fashion. A non-exhaustive list of example macro operations is provided below in Table 2.

TABLE 2

| Operation | Description |
|---|---|
| Macro Record | Begin Recording the Macro |
| Macro Save | Save the Recorded Macro |
| Macro Abort | Abort a Macro Operation |
| Macro Use | Use a Saved Macro |

The following subsections will describe details on each of the macro operations in Table 2.

Macro Record and Save

The basic operation of the macro record function is to store a list of search query/operations during the record period and generalize the managed object data in the query/operation with unique tokens that can be replaced during playback. The following use cases will illustrate the Macro Record functionality.

For example, a user may wish to add a user, edit the added user's advanced mailbox options, and manage the added user's direct inward dialing (DID) number entry. This macro may be termed "add_users_1".

This use case illustrates a macro record process involving a single managed object data record. The administrator may frequently perform a repetitive operation of adding users, and editing the advanced mailbox options and DID number. Each of the operations may involve a separate application (such as a User and Services Provisioning application, a mailbox web console, and a DID Programming Wizard). The administrator can record the query/operations for adding and editing the user data. In one aspect, the administrator can replay the macro to complete the programming.

The macro creation can proceed as shown in Table 3 below.

TABLE 3

| Step | Query/Operation | Description |
|---|---|---|
| 1 | Macro record | Start macro record process |
| 2 | Add user John Doe | Launches User and Services Provisioning in context of an add user operation for John Doe |
| 3 | Edit advanced mailbox John Doe | Launches Web Console in context of the mailbox page for John Doe's mailbox |
| 4 | Mange DID numbers | Launches DID Wizard Application |
| 5 | Macro save add_users_1 | Terminate macro record operation and save the recorded query/operations with the macro tagged as add_users_1 for reference in the future |

The macro in Table 3 can be stored as shown in Table 4 as follows.

TABLE 4

| Index | Query/Operation |
|---|---|
| 1 | Add use {parameter 1} |
| 2 | Edit advanced mailbox {parameter 1} |
| 3 | Manage DID numbers |

The managed object data (John Doe) is replaced with a unique token (i.e., {parameter 1}) when the macro is stored. During macro playback, the token can be replaced by the administrator with concrete managed object data or a range of managed object data to provide the correct context.

Another example implementation of a macro record operation for multiple managed object data records will now be described. In this case, the administrator wishes to edit a boss and the boss's secretary at the same time. Table 5 illustrates the process for recording the macro to edit the boss and the boss' secretary

TABLE 5

| Step | Query/Operation | Description |
|---|---|---|
| 1 | Macro record | Start macro record process |
| 2 | Edit user Sarah Jane | Launches User and Services Provisioning in context of an edit user operation in context of Sarah Jane (Boss) |

TABLE 5-continued

| Step | Query/Operation | Description |
| --- | --- | --- |
| 3 | Edit user Bill Philips | Launches User and Services Provisioning in context of an edit user operation in context of Bill Philips (Secretary) |
| 4 | Macro save edit_users_1 | Terminate macro record operation and save the recorded query/operations with the macro tagged as edit_users_1 for reference in the future |

As shown in TABLE 6 below, the saved macro (edit_users_1) involves two "edit user" operations. As a result, when executing the macro the search application will request two parameters to place the macro into proper context.

TABLE 6

| Index | Query/Operation |
| --- | --- |
| 1 | Edit user {parameter 1} |
| 2 | Edit user {parameter 2} |

Macro Use

The playback of macros can be invoked via the keywords "macro use" followed by the tokens to put the macro into context. "Macro use" is illustrated in Table 7 by applying concrete managed object data records to the macros add_users_1 and edit_users_1.

TABLE 7

| Macro | Example | Outcome |
| --- | --- | --- |
| add_users_1 | Macro use add_users_1 Ron Howard | Executes macro add_user_1 replacing {parameter 1} in the macro with Ron Howard |
| edit_users_1 | Macro use edit_users_1 Billy Tenant, Sara Conners | Executes macro edit_users_1 replacing {parameter 1} with Billy Tenant and {parameter 2} with Sara Conners for the macro |

Figure 15:
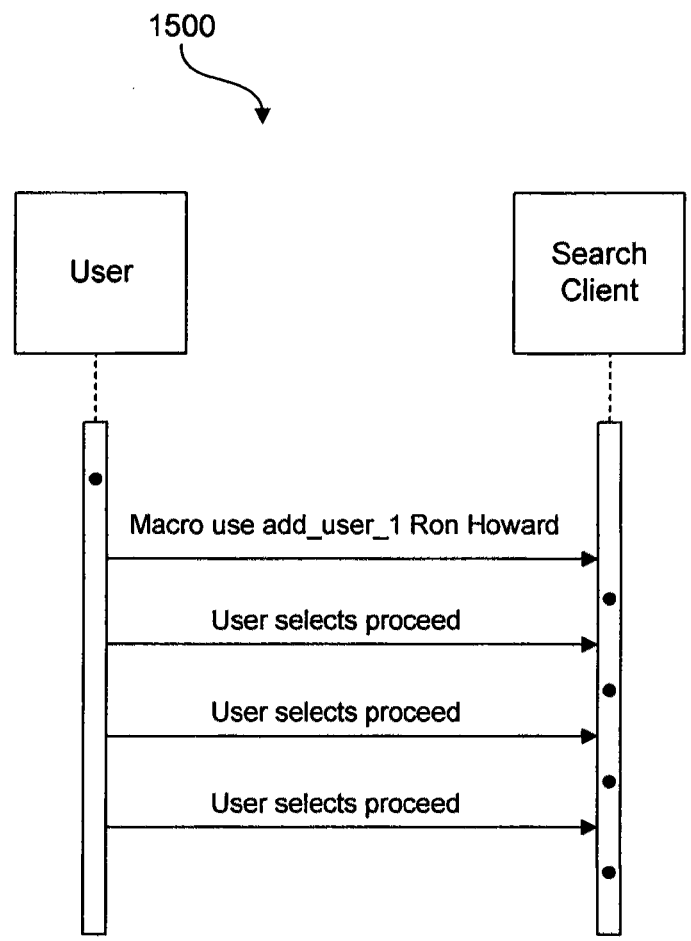
FIG. 15 depicts a message sequence chart for executing a macro in accordance with an embodiment of the present invention.

The execution of a macro can use the same approach as a range operation which presents results one by one, as described above. The add_users_1 macro will be examined in the context of the managed object data "Ron Howard" as further illustration. FIG. 15 shows a message sequence chart 1500 between the user and the search client. (The range operations described above provide more detailed examples for the end to end message sequence shown in FIG. 15). As shown in FIG. 15, the search client can push the recorded macro entries one by one to the user in the context of the managed object data record in the macro use operation. The macro can complete playback when each component of the macro has been completed, when the user selects to end the macro, and/or when the search query box is blanked out by the search client.

Range Programming and Macros

Macros can be used as an operation within range programming to create dynamic operations. The range programming described above included discussion of basic add, edit, read, and delete operations. A macro can easily be replayed within the same framework. Instead of looping through a single basic operation for each instance of a managed object data record in a range, the system can play back a macro in the context of each managed object data record in the range.

Using the add_users_1 macro as an example again, assume that there is a range of users with the following set {Jill Smith, John Smith, John Thomas}. To perform a range operation with this range on the add_users_1 macro (using the format described previously), the search query/operation can be formed by the user entering "range macro use add_user_1 from Jill Smith to John Thomas". This can invoke the system to sequentially perform the following macro operations:

a. macro use add_user_1 Jill Smith
b. macro use add_user_1 John Smith
c. macro use add_user_1 John Thomas.

History Support

The system can include a history feature allows the apparatus to display the previous query/operations used during the session. Some example history commands are shown in Table 8 below.

TABLE 8

| Query/Operation | Description |
| --- | --- |
| History | Provide a list of all query/operation results that was displayed in the search query box. |
| History N | Show the last N history entries. For example, "history 10" will show the last 10 entries. |
| History of all {x} | Show the history filtered by criteria {x}. For example, "history of all edit" will show all relevant entries related to edit queries/operations. |

Figure 16:
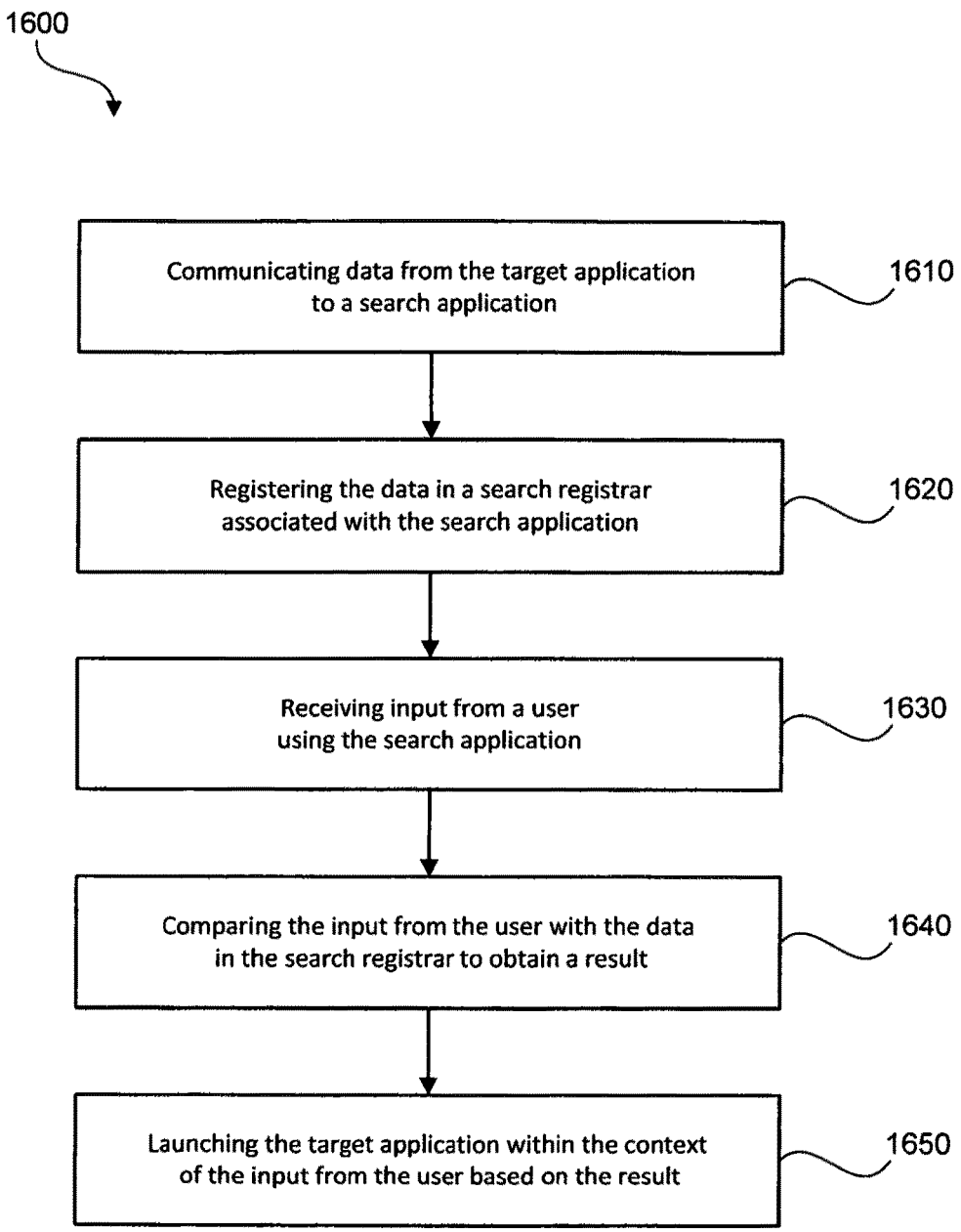
FIG. 16 illustrates a flow diagram of an example method for contextually launching a target application in accordance with an embodiment of the present invention.

FIG. 16 illustrates a flow diagram of a method 1600 for contextually launching a target application in accordance with an embodiment. The method includes communicating 1610 data from the target application to a search application. Communicating data can include proactively communicating unsolicited data from the target application to the search application. The data can be registered 1620 in a search registrar associated with the search application. Input can be received 1630 from a user using the search application. The input from the user can be compared 1640 with the data in the search registrar to obtain a result. The target application can be launched 1650 within the context of the input from the user based on the result.

The target application of the method may comprise one of a plurality of target applications and the method can further include displaying the plurality of target applications to the user on a display device based on the result. User selection of one of the plurality of target applications can be received before launching the target application.

The data may comprise access data for the search application to access a data store of the target application which comprises a list of nouns and a list of verbs representing operations for the application. In this example, the verbs are stored in the search registrar and the nouns are not stored in the search registrar.

In another example method, the input comprises a verb representing an operation for the target application and the input further comprises a noun representing a record managed by the target application. Launching the target application within the context in this example can further include launching the operation for the target application in the context of the record.

Where the input comprises an action representing an operation for the target application, and launching the target application with the context may further comprise launching the operation for the target application. Where the input comprises an object representing a record managed by the target application, the method may further comprise retrieving and displaying a list of operations performable on the record by the target application or by another application.

Where the input comprises a noun or verb not registered in the registrar, the method can further include referencing an electronic dictionary or electronic thesaurus, identifying a similar noun or verb, and comparing the similar noun or verb to the data in the search registrar.

In one aspect, the steps of obtaining the input and comparing the input in the method further include: determining whether the input comprises a range operation; identifying the target application to launch using the search application based on the input; and identifying a range of results to process with the target application using the search application and based on the input. In this example, launching the target application can include separately displaying the results within the range in the context of the target application.

Figure 17:
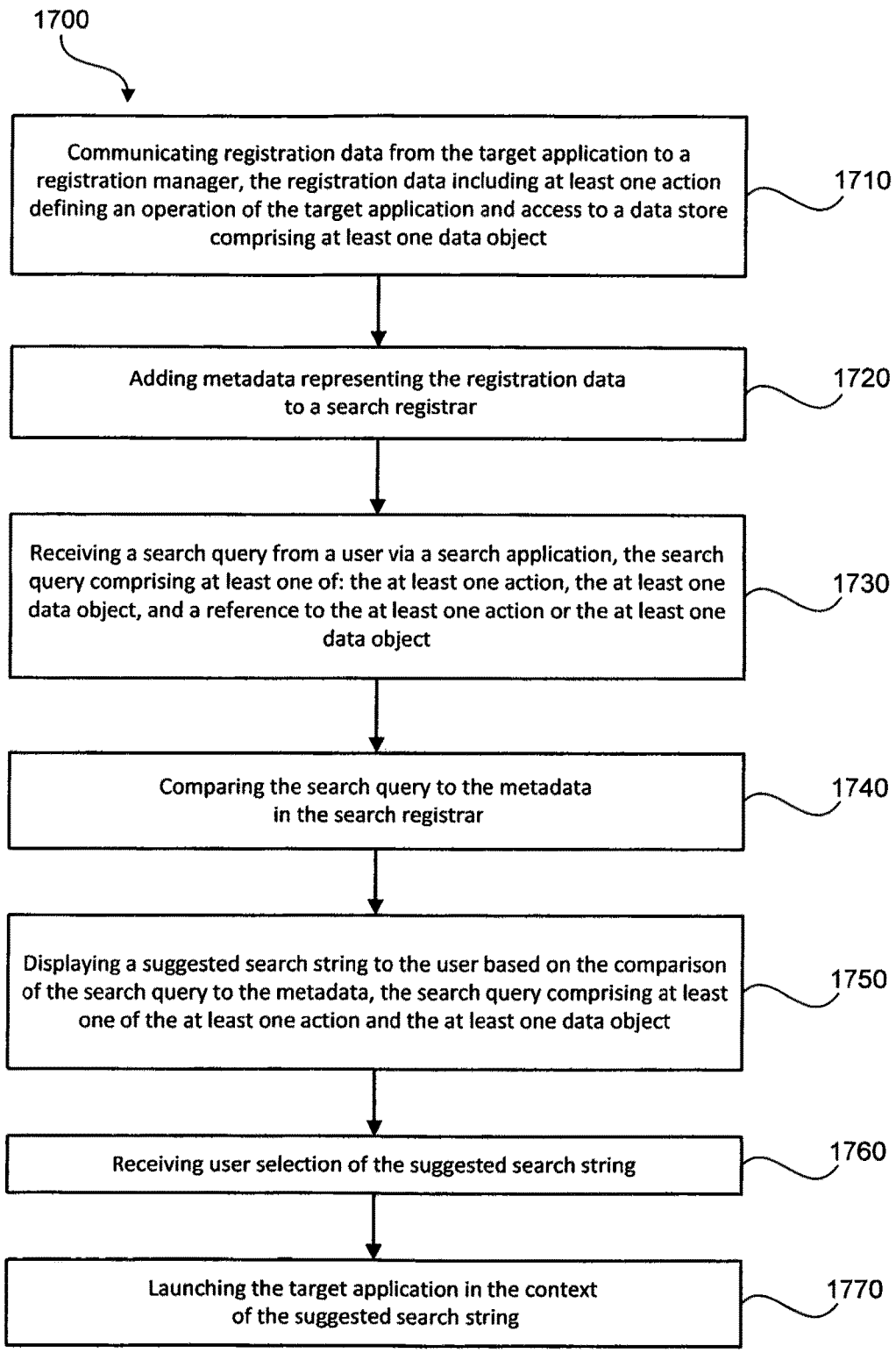
FIG. 17 illustrates a flow diagram of an example method for in-context search and launch of a target application in accordance with an embodiment of the present invention.

Referring to FIG. 17, a flow diagram of a method 1700 is shown for in-context search and launch of a target application in accordance with an embodiment. The method includes communicating 1710 registration data from the target application to a registration manager. The registration data can include one or more actions defining an operation of the target application and access to a data store having one or more data objects. Metadata representing the registration data can be added 1720 to a search registrar. A search query can be received 1730 from a user via a search application. The search query can include at least one of: an action, a data object, and/or a reference to the action or data object. The reference to the action or data object can be explicit or implicit. For example, the search query can include the word "manage" which can be associated with the "edit employee" application either in the search registrar or in the data store. As another example of a reference, the search query can include the word "administer" which may not be in either the search registrar or the data store, but which may be associated with "manage" or "edit" using a thesaurus or dictionary.

The method 1700 can continue by comparing 1740 the search query to the metadata in the search registrar. A suggested search string can be displayed 1750 to the user based on the comparison of the search query to the metadata. Finally, the method can include receiving 1760 user selection of the suggested search string and launching 1770 the target application in the context of the suggested search string.

Figure 18:
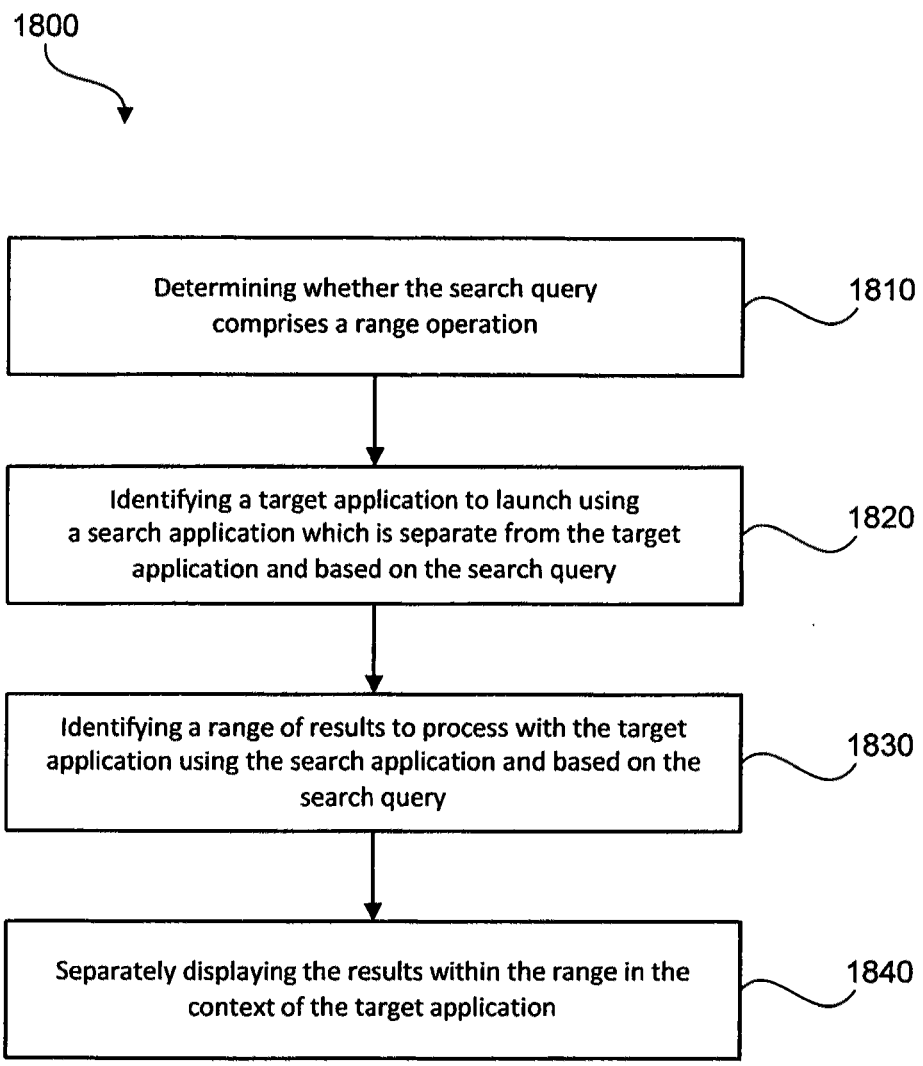
FIG. 18 illustrates a flow diagram of an example method for range programming using a search query in accordance with an embodiment of the present invention.

Referring to FIG. 18, a flow diagram of a method 1800 is shown for range programming using a search query. The method can include determining 1810 whether the search query comprises a range operation. A target application to launch can be identified 1820 using a search application which is separate from the target application and based on the search query. A range of results to process with the target application can also be identified 1830 using the search application and based on the search query. The results within the range can be separately displayed 1840 in the context of the target application. For example, the results can be sequentially displayed to a user by sequentially launching the target application in the context of the results, or the results can be simultaneously displayed to a user by simultaneously launching a plurality of instances of the target application, each of the plurality of instances being launched in the context of a different result from the range of results.

The method can include determining whether a different range operation is active before the steps of identifying the target application, identifying the range of results, and separately displaying the results. The different range operation can be canceled when the different range operation is active.

In a further example, the method can include determining whether the target application supports range programming and performing the steps of determining, identifying, and displaying when the target application does not support range programming. The range operation can be communicated to the target application when the target application does support range programming.

In another example, the target application comprises one of a plurality of target applications, and the method further includes using a macro to launch each of the plurality of target applications for each result within the range of results to separately display the results within the range in the context of the plurality of target applications.

Figure 19:
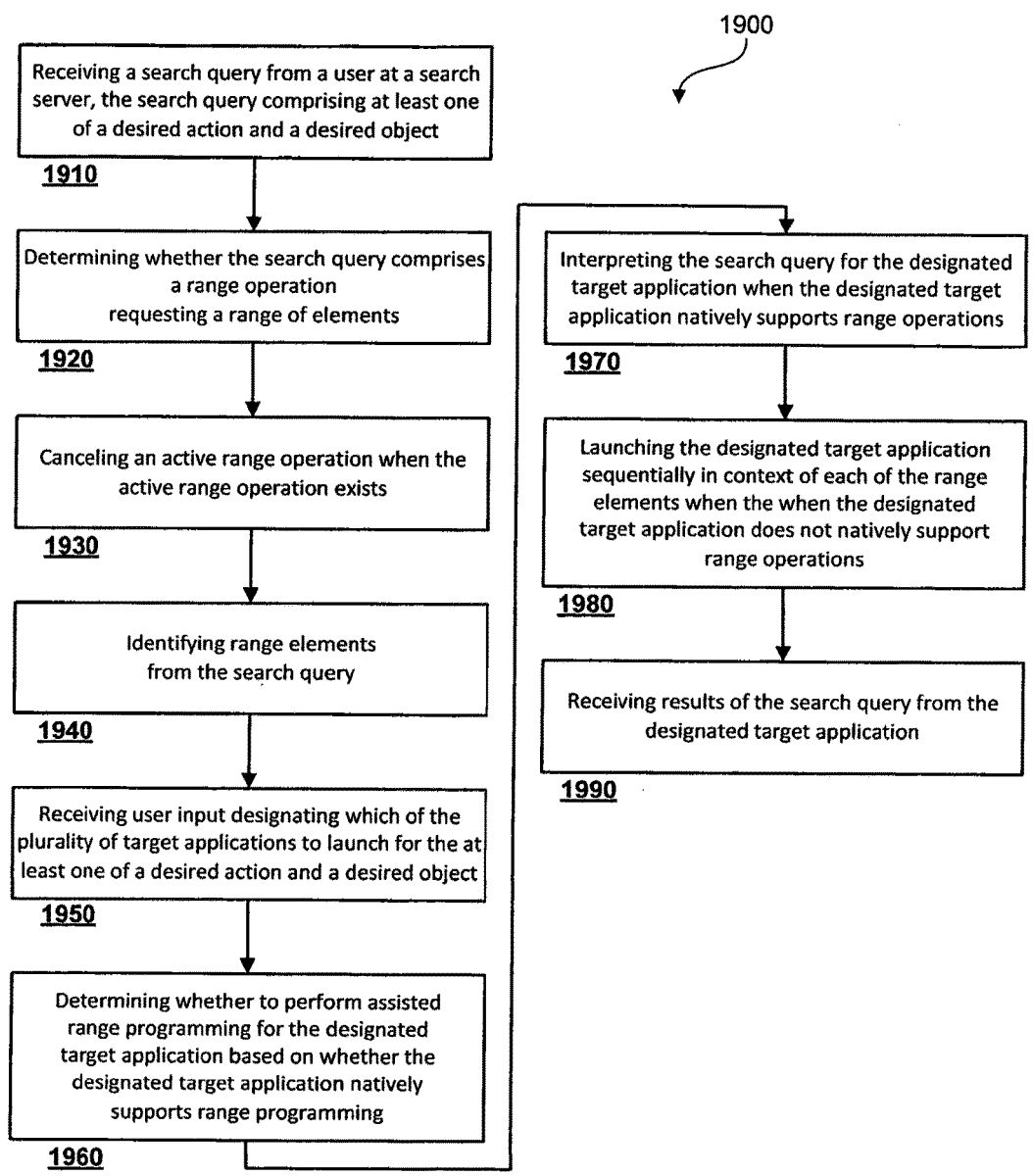
FIG. 19 illustrates a flow diagram of an example method for implementing range operations in a consolidated enterprise support system having a plurality of target applications in accordance with an embodiment of the present invention.

Referring to FIG. 19, a flow diagram of a method 1900 is shown for implementing range operations in a consolidated enterprise support system having a plurality of target applications. In this example, at least one of the target applications does not natively support range operations.

The method 1900 can include receiving 1910 a search query from a user at a search serve. The search query can include an action and/or an object. The method can also include determining 1920 whether the search query comprises a range operation requesting a range of elements. If an active range operation exists, the active range operation can be canceled 1930. Range elements can be identified 1940 from the search query. The method can include receiving 1950 input from a user, such as an administrator, designating which of the target applications to launch for the action and/or object. A determination 1960 can be made as to whether to perform assisted range programming for the designated target application based on whether the designated target application natively supports range programming. The search query can be interpreted 1970 for the designated target application when the designated target application natively supports range operations. When the designated target application does not natively support range operations the designated target application can be launched 1980 sequentially in the context of each of the range elements. Results of the search query can be received 1990 from the designated target application.

The method can further include displaying the results to the user by opening the results for each element in the range in a separate window simultaneously or sequentially. Also, the method can include creating and storing a session identification associated with the search query.

The foregoing systems and methods can be useful in a number of different environments and situations. The systems and methods can simplify and/or eliminate navigation complexity and application operation. Particularly considering the heterogeneous vendor normalization and consolidation of enterprise systems to support management of various tasks, the described systems and methods can enable a faster, simpler, deeper, and more useful and comprehensive interaction with the enterprise system.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for contextually launching a target application, comprising:
communicating data from the target application to a search application, the data comprising a list of actions representing operations for the target application;
registering the list of actions in a search registrar associated with the search application;
receiving input from a user using the search application;
comparing the input from the user with the list of actions in the search registrar to obtain a result;
matching the input from the user with one of the actions in the list of actions;
launching the target application within the context of the operation represented by the matching action;
determining whether the input comprises a range operation;
determining whether the target application natively supports range programming;
transmitting the range operation to the target application when the target application natively supports range operations; and
displaying a plurality of results of the range operation in the context of the target application when the target application does not natively support range operations.

2. A method as in claim 1, wherein the target application comprises one of a plurality of target applications, each of the plurality of target applications having associated with it a list of actions representing operations for that target application, the method further comprising displaying each of the plurality of target applications having an operation represented by an action matching the input on a display device and receiving user selection of one of the plurality of target applications before launching the target application.

3. A Method as in claim 1, wherein communicating data comprises proactively communicating unsolicited data from the target application to the search application.

4. A method as in claim 1, wherein the data comprises a list of objects in a data store of the target application.

5. A method as in claim 1, wherein the data comprises access data for the search application to access a data store of the target application.

6. A method as in claim 5, wherein the data store comprises a list of objects.

7. A method as in claim 1, wherein the data comprises access data for the search application to access a data store of the target application which comprises a list of nouns and a list of verbs representing operations for the application, and wherein the verbs are stored in the search registrar and the nouns are not stored in the search registrar.

8. A method as in claim 1, wherein the input comprises a verb representing an operation for the target application and the input further comprises a noun representing a record managed by the target application, and wherein launching the target application with the context further comprises launching the operation for the target application in the context of the record.

9. A method as in claim 1, wherein the input comprises an action representing an operation for the target application and wherein launching the target application with the context further comprises launching the operation for the target application.

10. A method as in claim 1, wherein the input comprises an object representing a record managed by the target application, the method further comprising retrieving and displaying a list of operations performable on the record by the target application or by another application.

11. A method as in claim 1, wherein the input comprises a noun or verb not registered in the registrar and the method further comprises referencing an electronic dictionary or electronic thesaurus, identifying a similar noun or verb, and comparing the similar noun or verb to the data in the search registrar.

12. A method as in claim 1, wherein receiving the input and comparing the input further comprises:
identifying the target application to launch using the search application based on the input;
identifying a range of results to process with the target application using the search application and based on the input; and
wherein launching the target application further comprises separately displaying the results within the range in the context of the target application.

13. A system for contextually launching a target application within a consolidated enterprise support system, comprising:
a search client for receiving the input from the user, and wherein the input from the user comprises a user search query;
a search server for performing a search for the target application or target application data based on the user search query;
a plurality of target applications, each comprising different target application data and being managed by the consolidated enterprise support system, the target application data comprising a list of actions representing operations for that target application;
a search registrar associated with the search server for registering the list of actions;
a processor;
a memory coupled to the processor, the memory storing program instructions that when executed by the processor, causes the processor to:
transmit the list of actions to the search server without solicitation and before the search client receives the user search query;
match the input from the user with one of the actions in the list of actions; and
launch at least one of the plurality of target applications within the context of the operation represented by the matching action; and
a range operation module configured to determine whether the user search query comprises a range operation and to determine whether the at least one of the plurality of target applications natively supports range programming; and
wherein the program instructions further cause the processor to transmit the range operation from the search server to the at least one of the plurality of target applications when the at least one of the plurality of target applications natively supports range operations and to launch the at least one of the plurality of target applications using the search server to separately display a plurality of results of the search based on the range operation in the context of the at least one of the plurality of target applications when the at least one of the plurality of target applications does not natively support range operations.

14. A system as in claim 13, wherein the program instructions further cause the processor to create a generic shortcut for an in-context search based on a specify search query.

15. A system as in claim 14, wherein the program instructions further cause the processor to automatically suggest creation of a shortcut when the user search query comprises a same search query used a predetermined number of times.

16. A system as in claim 13, wherein the program instructions further cause the processor to record and play back a plurality of user search queries as a single macro.

17. A system as in claim 13, wherein the program instructions further cause the processor to add metadata to the search registrar based on the target application data.

\* \* \* \* \*